United States Patent
Seller et al.

(10) Patent No.: US 10,148,313 B2
(45) Date of Patent: Dec. 4, 2018

(54) COMMUNICATION DEVICE AND METHOD IN THE CELLULAR BAND

(71) Applicant: Semtech Corporation, Camarillo, CA (US)

(72) Inventors: Olivier Bernard André Seller, Sainte Soulle (FR); Nicolas Sornin, La Tronche (FR)

(73) Assignee: Semtech Corporation, Camarillo, CA (US)

( * ) Notice: Subject to any disclaimer, the term of this patent is extended or adjusted under 35 U.S.C. 154(b) by 0 days.

(21) Appl. No.: 15/621,601

(22) Filed: Jun. 13, 2017

(65) Prior Publication Data

US 2017/0324441 A1    Nov. 9, 2017

Related U.S. Application Data

(63) Continuation of application No. 15/058,978, filed on Mar. 2, 2016, now Pat. No. 9,800,288.

(60) Provisional application No. 62/127,617, filed on Mar. 3, 2015.

(51) Int. Cl.
| | |
|---|---|
| *H04B 1/69* | (2011.01) |
| *H04W 56/00* | (2009.01) |
| *G01S 5/02* | (2010.01) |
| *G01S 5/14* | (2006.01) |
| *G01S 7/40* | (2006.01) |

(Continued)

(52) U.S. Cl.
CPC ............... *H04B 1/69* (2013.01); *G01S 5/021* (2013.01); *G01S 5/14* (2013.01); *H04W 56/0015* (2013.01); *G01S 7/40* (2013.01); *G01S 13/74* (2013.01); *G01S 2013/466* (2013.01); *H04B 2001/6912* (2013.01)

(58) Field of Classification Search
CPC ..... H04B 1/69; H04B 2001/6912; G01S 5/14; G01S 7/40; G01S 13/74; G01S 2013/466; H04W 56/0015

See application file for complete search history.

(56) References Cited

U.S. PATENT DOCUMENTS

| | | | |
|---|---|---|---|
| 6,064,695 | A | 5/2000 | Raphaeli |
| 6,304,619 | B1 | 10/2001 | Citta |
| RE38,808 | E | 10/2005 | Schuchman |

(Continued)

FOREIGN PATENT DOCUMENTS

| | | |
|---|---|---|
| EP | 2449690 A1 | 5/2012 |
| EP | 2767848 A1 | 8/2014 |

(Continued)

OTHER PUBLICATIONS

European Search Report for EP Application No. 16158282.0, dated Jul. 4, 2016, 9 pages.

(Continued)

*Primary Examiner* — Freshteh N Aghdam
(74) *Attorney, Agent, or Firm* — Blank Rome LLP

(57) ABSTRACT

A wireless communication method in a network comprising a plurality of nodes including ranging masters, broadcasting a chirp-modulated ranging requests, and ranging slaves slave, replying with thereto with chirp-modulated ranging responses, whereby mobile nodes can locate themselves passively by listening to the request/reply exchanges, based on the respective time differences of arrival.

9 Claims, 10 Drawing Sheets

(51) Int. Cl.
*G01S 13/74* (2006.01)
*G01S 13/46* (2006.01)

(56) References Cited

U.S. PATENT DOCUMENTS

| | | | |
|---|---|---|---|
| 8,675,710 B2* | 3/2014 | Hiscock | H04B 1/69 375/139 |
| 2009/0295639 A1 | 12/2009 | Zhao | |
| 2011/0019649 A1* | 1/2011 | Dayal | G01S 5/10 370/336 |
| 2011/0064119 A1 | 3/2011 | Sforza | |
| 2011/0292820 A1* | 12/2011 | Ekbal | G01S 5/14 370/252 |
| 2012/0032855 A1* | 2/2012 | Reede | G01S 5/0289 342/458 |
| 2012/0300814 A1* | 11/2012 | Schaffner | G01S 11/04 375/139 |
| 2014/0225762 A1 | 8/2014 | Seller | |
| 2014/0253389 A1 | 9/2014 | Beauregard | |
| 2014/0266914 A1* | 9/2014 | Schwartz | G01S 5/14 342/463 |
| 2016/0259062 A1 | 9/2016 | Raghupathy | |

FOREIGN PATENT DOCUMENTS

| | | |
|---|---|---|
| WO | WO-91/16639 A1 | 10/1991 |
| WO | WO-96/26579 A1 | 8/1996 |
| WO | WO-96/26591 A1 | 8/1996 |
| WO | WO-99/23790 A1 | 5/1999 |
| WO | WO-2007/102113 A2 | 9/2007 |
| WO | WO-2014/124785 A1 | 8/2014 |
| WO | WO-2015/158931 A2 | 10/2015 |

OTHER PUBLICATIONS

Extended European Search Report for EP Application No. 17159657.0, dated Jun. 30, 2017, 8 pages.

* cited by examiner

COMMUNICATION DEVICE AND METHOD IN THE CELLULAR BAND

REFERENCE DATA

The present application is a continuation of Ser. No. 15/058,978, filed on Mar. 2, 2016, which claims benefit from U.S. provisional patent application 62/127,617, filed on Mar. 3, 2015. The entire contents of those applications are hereby incorporated by reference.

FIELD OF THE INVENTION

The present invention concerns, in embodiments, a communication protocol intended to serve as physical layer for an "Internet of Things" network. In particular, but not exclusively, the protocol and the devices that are the object of the present invention can be included, or rely upon, existing cellular phone infrastructure and occupy frequency bands allocated to cell phone networks.

RELATED ART

The LoRa communication protocol and devices are based on Chirp-Based modulation that combine low power and long communication ranges. They are therefore ideally suitable for implementing networking capabilities in very small, battery-operated objects.

Narrow- and Ultra-narrow band modulation is another technique that can be used to establish radio wireless communication between a plurality of nodes. The very narrow bandwidths required by these modulation modes are especially demanding to the precision of synchronization between transmitter and receiver.

Satellite based systems are providing positioning capability to self-locating devices. GPS is the first one, Glonass system is a very useful complement, and Galileo system will follow with new capabilities. Terrestrial or sea location services based on differences in timing of radio signals have also long existed, for example the DECCA and LORAN.

All these systems share the same principle: time or frequency synchronized stations of known location broadcast radio signals, end-points receive them and derive their location.

The location of LoRa devices is also possible with either ranging, or location of transmitting end-point, as disclosed, among others, in patent applications EP2449690, US20140225762 and WO2014124785 assigned to the present applicant, and which are hereby incorporated by reference.

The so-called 'Internet of things' is a network of physical objects, devices, and other items that have an embedded software and electronic means for exchanging data between them, using wired and/or wireless interfaces. There is a consensus that many of the future "internet of Things" application will involve small low-cost portable devices that have neither access to a wired network, nor a permanent supply of energy.

Another concern for the developers of connected objects is that the radio bands available to the communication are necessary limited, and the transmissions are strictly regulated in order to minimise interferences. In a typical IoT scenario, each individual node generates a modest volume of data, and communicates infrequently but, since the number of deployed nodes is very large, the capacity of the network quickly becomes a limiting factor. In this context, there is a need for communication systems and method that both energy and spectrally efficient, in order to maximise the autonomy of battery-operated objects, increase the maximum distance at which communications are possible, and use at best the available radio space. There is also a need of a communication method that has low computation complexity, both for cost and energy considerations.

BRIEF SUMMARY OF THE INVENTION

It is an aim of the present invention providing an improved system that overcomes the shortcomings of the prior art, and in particular a communication system and communication devices that combine a very low power, simple and spectrally efficient communication channel, and allow a precise positioning of stationary or fast moving objects by the network infrastructure for asset tracking or other applications that require location information.

According to the invention, this aim is achieved by means of the object of the appended claims.

In particular, embodiments of the present invention relate to a wireless communication network including a plurality of nodes, each node having a time reference, and being arranged for receiving and transmitting chirp-modulated radio signals, wherein the phase of the chirps is described by a continuous function, such that a node receiving the radio signal can align its time reference with that of a node transmitting the radio signal, wherein at least a subset of the nodes, acting as master, are arranged to broadcast a chirp-modulated ranging request, and at least a subset of the nodes, acting as slave, are arranged to receive the ranging requests and reply with a chirp-modulated ranging response, and at least one mobile node is operatively arranged to receive both the ranging requests of the masters and the ranging responses of the slaves, and determine for each pair of one ranging request and one ranging reply, a difference of the propagation time between the master and the mobile node minus the propagation time between the slave and the mobile node, whereby the mobile node is located, based on said difference of propagation times and on the positions of said masters and slaves.

The invention also includes variants as outlined above in which antenna, frequency and time diversity is used at the master and slaves, to enhance localization, and in which the localization is carried out partly in the infrastructure of the network, rather than integrally in the mobile node. It is also foreseen that several slaves may reply to one single ranging request, staggering the replies by known or determinable delays such that they can be do not overlap in chirp space, and in which the ranging requests are planned such as not to overlap in time and such that the baselines joining masters and their respective slave are oriented differently, preferably at right angles.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Recall of LoRa Modulation

Figure 1:
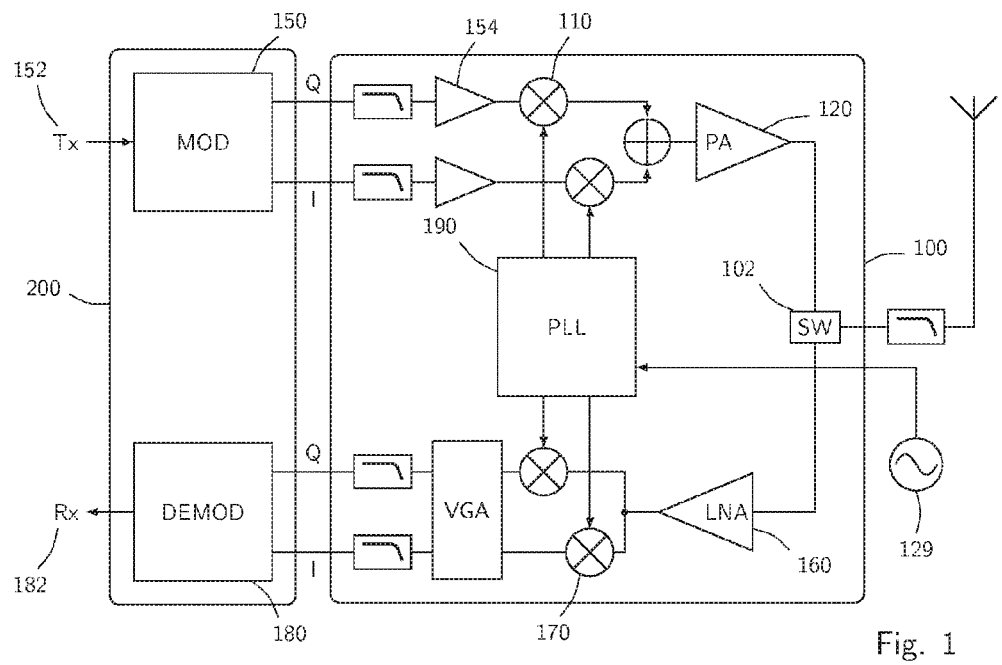
FIG. 1 illustrates schematically the structure of a node of a wireless network compatible with the present invention.

Several aspects of the chirp modulation technique employed in the present invention are described in European Patent Applications EP2449690 and EP2767848, which are hereby incorporated by reference, and will be reminded here summarily. The radio transceiver that is represented schematically in FIG. 1 is part of a possible embodiment of the invention. It includes a baseband section 200 and a radiofrequency section 100. Concentrating on the transmitter part, the baseband modulator 150 generates, based on the digital data 152 that are present at its input, a baseband signal whose I and Q component are converted to the desired transmission frequency by the RF section 100 amplified by the power amplifier 120, and transmitted by the antenna. This architecture allows several variants and modifications without departing from the frame of the invention, and is a non-limiting example. For example, the transceiver could synthesize the polar components amplitude A and phase $\phi$, rather than the Cartesian ones I and Q.

The conversion of the signal from the baseband to the intended frequency is done, in this example, by mixing in mixer 110 the signal provided by amplifiers 154 with the in-phase and quadrature components of a local carrier generated by circuit 190, and linked to a reference clock 129.

Once the signal is received on the other end of the radio link, it is processed by the receiving part of the transceiver of FIG. 1 comprises a low noise amplifier 160 followed to a down-conversion stage 170 that generates a baseband signal comprising a series of chirps, that is then processed by the baseband demodulator 180, whose function is the reverse of that of the modulator 150, and provides a reconstructed digital signal 182.

As discussed in EP2449690, the modulator 150 synthesizes a baseband signal that comprises a series of chirps whose frequency changes, along a predetermined time interval, from an initial instantaneous value $f\_0$ to a final instantaneous frequency $f\_1$. It will be assumed, to simplify the description, that all the chirps have the same duration T, although this is not an absolute requirement for the invention. The chirps can be described by the time profile f(t) of their instantaneous frequency or also by the function $\phi(t)$ defining the phase of the signal as a function of the time. Chirps may have one of a plurality of different profiles, each corresponding to a symbol in a predetermined modulation alphabet.

Figure 2A:
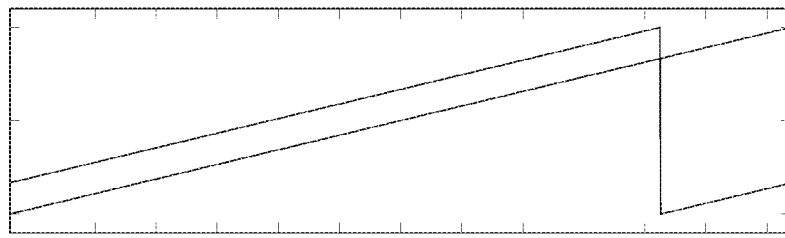
FIG. 2a plots the instantaneous frequency of a base chirp and of a modulated one according to one aspect of the present invention. The phases of the same signals are represented in FIG. 2b, while FIG. 2(c) plots the real and the complex components of the base chirp, in the time domain.
Figure 2B:
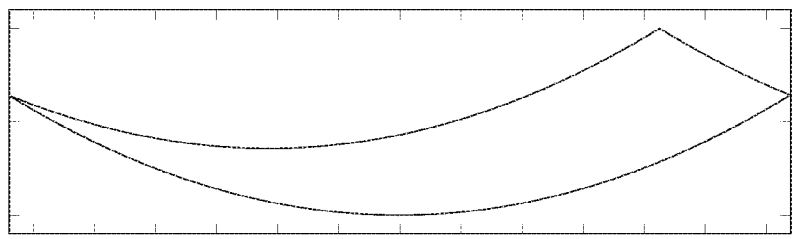
Figure 2C:
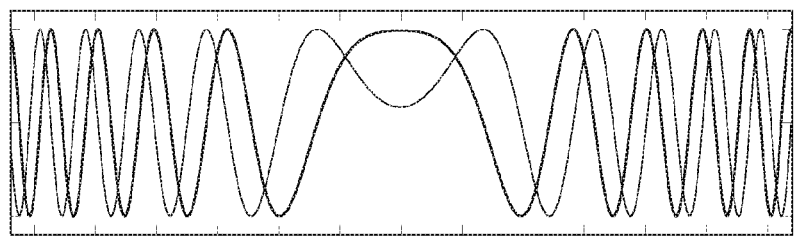

Importantly, the modulator 150 can generate either base chirp (also unmodulated chirps) that have specific and predefined frequency profile, or one out of a set of possible modulated chirps, obtained by time-shifting cyclically the base chirp's frequency profile. FIGS. 2a-b illustrate possible frequency and phase profiles of a base chirp and of a modulated one, while FIG. 2c shows the corresponding baseband signals in the domain of time.

In the example depicted, the frequency of a base chirps increases linearly from an initial value $f\_0=-BW/2$ at $t=t\_0$, to a final value $f\_1=BW/2$, at $t=t\_1$, where BW stands for the amount of bandwidth spreading, but descending chirps or other chip profiles are also possible. Thus, the information is encoded in the form of chirps that have one out of a plurality of possible cyclic shifts with respect to a predetermined base chirp, each cyclic shift corresponding to a possible modulation symbol.

Preferably, the modulator is also arranged to synthesize and insert in the signal conjugate chirps, that are complex-conjugate of the base unmodulated chirp. One can regard these as down-chirps in which the frequency falls from a value of $f\_0=+(BW)/2$ to $f\_1=-(BW)/2$.

Preferably, the phase of the chirps is described by a continuous function $\phi(t)$, that has the same value at the beginning and at the end of a chirp: $\phi(t\_0)=\phi(t\_1)$. Thanks to this, the phase of the signal is continuous across symbol boundaries, a feature that will be referred to in the following as inter-symbol phase continuity. The demodulator unit 180 in the receiver can align its time references with that of the transmitter, and determine the amount of cyclical shift imparted to each chirp. The operation of evaluating a time shift of a received chirp with respect to a local time reference may be referred to in the following as "dechirping", and can be carried out by multiplying the received chirp by a complex conjugate of a locally-generated base chirp, and performing a FFT. The position of the maximum of the FFT is indicative of the shift, and of the modulation value. Other dechirping methods are possible.

Thus, "cyclic shift value" may be used in the following to indicate the modulation in the time domain, and "modulation position", or "peak position" represent the same in the frequency domain. We will denote with N the length of the symbol or, equivalently, the spreading factor, with 1/BW the Nyquist sampling frequency and with N/BW the length of a symbol. Preferably, N is a power of two. In a possible application, BW might be 1 MHz and N equal to 1024, 512, or 256. The carrier frequency may be in the 2.45 GHz ISM band. In this particular embodiment, the modulation schema of the invention could occupy the same RF band as a Bluetooth® transceiver and, possibly, reuse or share the RF parts of a Bluetooth® transceiver.

Hence, a modulated symbol is a cyclic shift of the base symbol, of any number between 0 and N−1. A modulation value of 0 is equivalent to the absence of modulation. Since N is a power of two, the value of the cyclic shift can be coded over $\log\_2 N$ bits.

Preferably, the signal transmitted and received by the invention are organized in frames that include a preamble and a data section, suitably encoded. The preamble and the data section comprise a series of chirps modulated and/or unmodulated, that allow the receiver to time-align its time reference with that of the transmitter, retrieve information, perform an action, and so on. Several structures of frame are possible.

According to an aspect of the invention, transmitters and receiver nodes have preferably a communication mode that allow exchange of data by modulated chirp signals, and/or a ranging mode in which ranging exchange of signals takes place between a master device and a slave device that leads to the evaluation of the range between them. The slave is arranged for recognizing a ranging request and transmit back a ranging response containing chirps that precisely aligned in time and frequency with the chirps in the ranging requests, whereupon the master can receive the ranging response, analyse the time and frequency the chirps contained therein with respect to his own time reference, and estimate a range to the slave.

Figure 3:
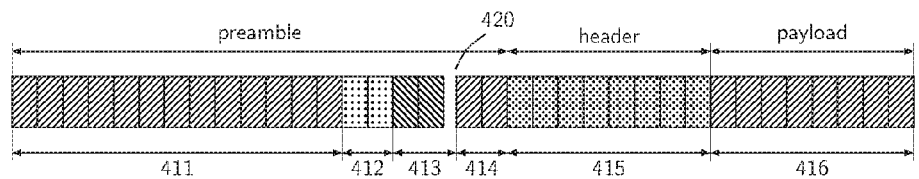
FIG. 3 represents schematically the structure of a data frame exchanged between two devices during the ranging method of the present invention.

FIG. 3 represents schematically a possible structure of a frame that may include a data packet and/or a ranging request. The frame starts with a preamble that may have a structure in common with other frames exchanged in the system of the invention for other purposes, and includes a detect sequence 411 of base (i.e. un-modulated, or with cyclic shift equal to zero) symbols. The detect sequence 411 is used in the receiver to detect the beginning of the signal and, preferably, perform a first synchronization of its time reference with the time reference in the transmitter. By dechirping the demodulated detect sequence, the receiver determines a shift amount.

The end of the detect sequence is marked by one or more, preferably two, frame synchronization symbols 412 that are chirps modulated with predetermined values, for example a first chirp with a modulation value of 4, and a second one with the opposite modulation N−4. Preferably, the modulation of the frame synchronization symbols is larger, in absolute shift, than 3 units to minimize the likelihood of errors. The use of a single modulated symbol as frame synch marker, or of the same modulation value for several symbols are also possible, but not optimal.

The predetermined modulation values of the frame synchronization symbols 412 can be used also as network signature, allowing the coexistence of several networks without receiving each other's packets.

According to another aspect of the invention, the preamble includes preferably frequency synchronization symbols 413 that consist in one or more, preferably two chirps that are complex-conjugate of the base unmodulated chirp. The conjugate symbols may be replaced by chirps that have a different bandwidth or duration than the base chirps, thus exhibiting a frequency variation that is faster, or slower than that of the base chirps. This variant would require a more complex receiver, but, on the other hand, leaves the conjugate-chirps free to use for data transmission. The apparent value of modulation will give the frequency error, thanks to the time-frequency equivalence property of chirps. To let the receiver align in time, a silence 420 is inserted after the symbols 413.

Optionally, the header further includes fine synchronization symbols 414 that are unmodulated base chirps, for example, and give the opportunity of a fine time and frequency synchronization and allows the implementation of fully coherent receivers simply. They permit the correction of frequency offset that may arise relying solely of the frequency synchronization symbols 413. In alternative, the transmission could use a reduced set of modulation values, at the expense of lower data rate.

The header part of the frame is a data field 415 that includes an indication of the frame purpose, for example that the frame is intended for ranging, and an identification code of the specific device whose ranging is needed. Only this specific device having an identification code equal to that specified in the header should respond to the ranging request.

The ranging symbols 416 are a succession of unmodulated chirps having a predetermined time structure. In a preferred embodiment, they are a succession of unmodulated chirps, i.e. base chirps.

Figure 6:
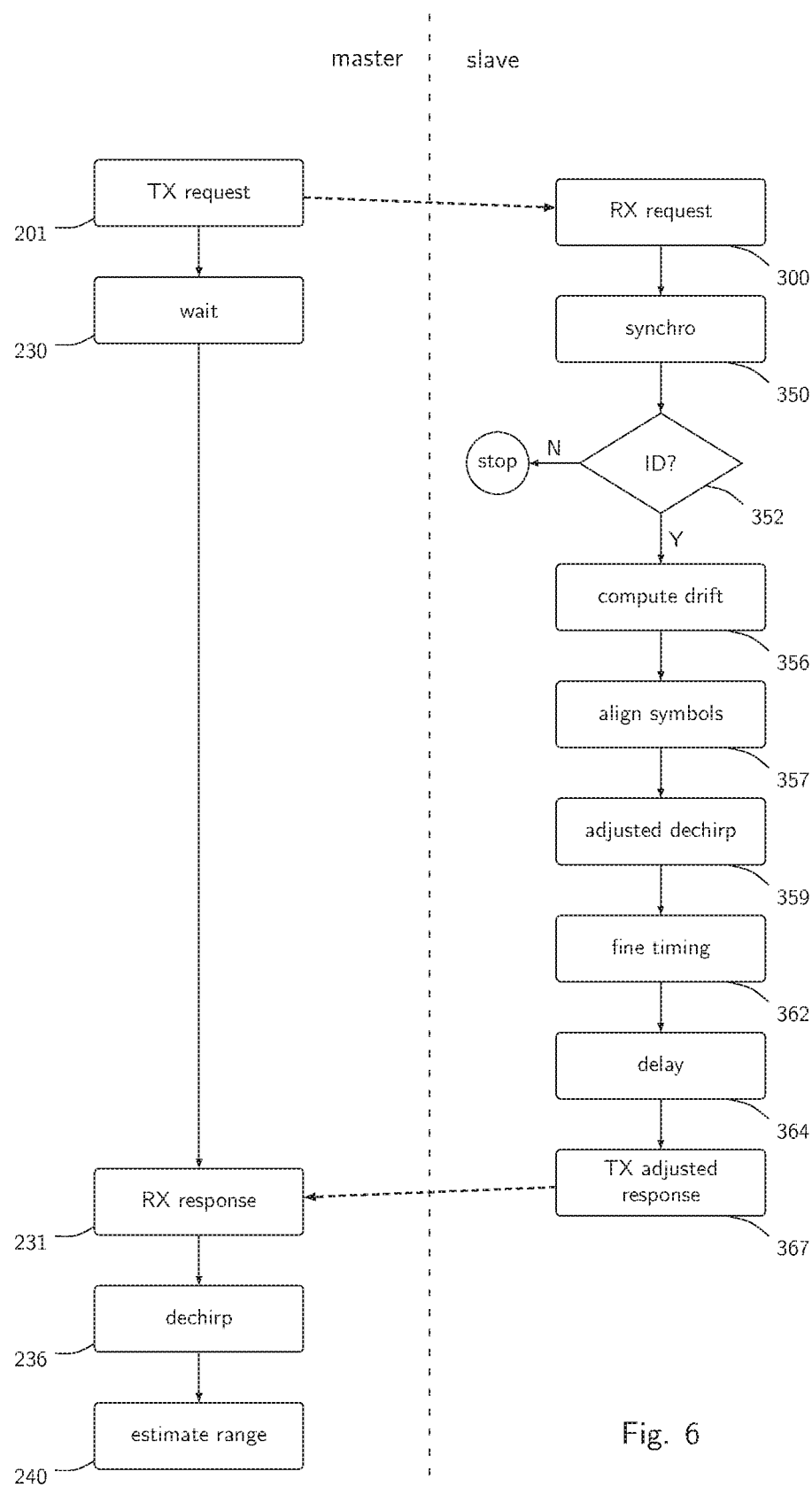
FIG. 6 shows schematically the steps used in a possible embodiment of the invention.

FIG. 6 illustrates schematically a possible sequence of steps in master and slave devices during a ranging exchange. The exchange is initiated by the master that transmits a ranging request (step 201) designating a particular slave device, and then waits (step 230) for the appropriate response. The slave receives the request (step 300) and deals with it as with a normal transmission at first. It runs usual steps of detection, time and frequency synchronization (step 350), and header decoding. Then it finds out that frame is a ranging request, and compares (step 352) the ranging request ID to its own ID. If they match, it will proceed to next steps. During this first phase, the slave has estimated a frequency offset between master and itself. This frequency offset is used to compute (step 356) a timing drift between them, assuming timing and frequency derive from a same time reference. The slave then carries out the ranging specific steps:

a-Ranging synchronization (step 357): this is to align in time to the ranging symbols transmitted by the master. Indeed, there can be a time offset right after the header, as the header is robust to minor time offsets.

b-Ranging computation (step 359). For each symbol, an adjusted dechirp operation is performed. A different local chirp is synthesized for dechirping each symbol in order to adjust for the timing drift: first, the slope of the chirp is modified, by a very small fraction corresponding to the crystal offset. Second, the starting frequency of the chirp is modified, to accommodate the accumulated timing error since the ranging synchronization instant, this value is equal to the symbol index times an evaluated timing drift per symbol. We here use fully the frequency-time equivalence of chirps meaning that a time offset is equivalent, in certain aspects, to a frequency offset, and the fact that these compensations are very small, typically of some PPMs, and would not make the signal step away from the channel. In alternative, the receiver could interpolate over time, but this would be more complex.

After FFT, the relative value of output at expected position (bin 0, no modulation) is compared to its neighbours. Then an interpolation is performed to find a fine timing (step 362). This amounts to evaluating the frequency of a sinusoid from a discrete observation of FFT values not exactly placed on the desired frequency, and can be carried out in various ways.

Several symbols are averaged together to get the fine timing estimate. This allows the slave to determine the exact timing instant at which the response is to be transmitted by adding together the Coarse Timing shift and the Fine Timing shift determined form the header (step 350), the duration of the ranging sequence given by the expression Ranging_symbols_numbers×(symbol_duration+timing_drift_per_symbol) and a predetermined ranging response offset. The slave thus waits until the timing instant (step 364) and transmits a ranging response (step 367).

The ranging response offset is a predetermined time interval that accommodates processing time, and uses the delay inside receive and transmit radios of the slave. Assuming the estimates are correct, the ranging response starting time of the signal at the antenna should equal the starting time of the received request, plus a fixed offset, preferably corresponding to an integer number of symbols. The ranging response offset can be constant or adaptively adjusted in order to compensate for temperature changes or other drift sources.

Importantly, by determining the coarse and fine time shift estimates and the timing drift, the slave device of the invention is capable to determine the time and frequency shifts of its own time reference with respect to that of the master, based on the time and frequency of chirps contained in the ranging request, thanks to the special property of the ranging request that includes chirp-modulated signals as explained above.

The ranging response is made of several unmodulated chirps. Preferably, the same compensation is used than during the adjusted dechirp step 359 in ranging computation: a slope compensation, plus a timing drift accumulation compensation. This comes in addition to a compensation of transmitted frequency, according to estimated frequency. In this way, the ranging response is precisely aligned in time and frequency with the time reference of the master.

Here it is important to notice that the system is robust to small errors in frequency offset. If a small error occurs, the receiving frequency and transmitted frequency will be slightly wrong, however the timing drift estimation will be almost correct. This is because timing drift estimation is the division of estimated frequency by carrier frequency. At 868 MHz for instance, an error of 120 Hz, which is an unlikely error of a full FFT bin using a spreading factor of 4096 and a bandwidth of 500 KHz, results in an error of only 0.13 ppm: this would give only a 1.5 meters ranging error. Second, as the response is time aligned to the request, if there is an error in estimated frequency, it will be compensated by a proportional error in time synchronization, such that the frequency=f(time) functions of received signal and demodulating signal are aligned. The impact of mis-synchronization is then only a tiny degradation of received energy.

Figure 4A:
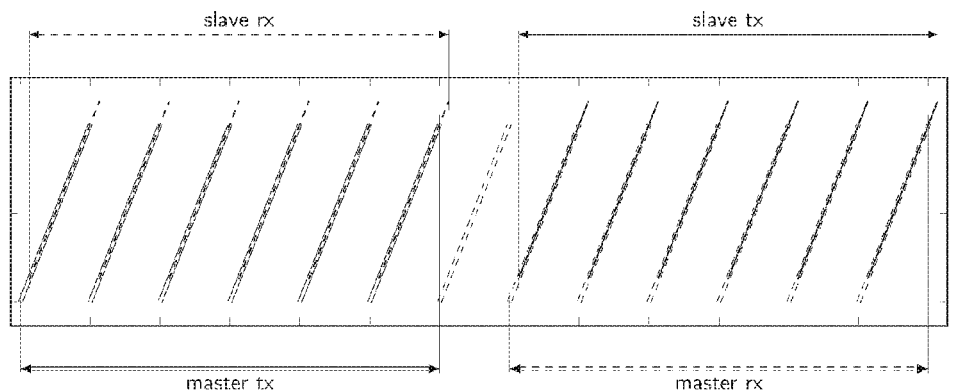
FIGS. 4a and 4b illustrate the time-alignment of chirp-modulated signals between a master and a slave device involved in the ranging process used in the present invention, showing two possible timing errors, and the misalignments that are involved.
Figure 4B:
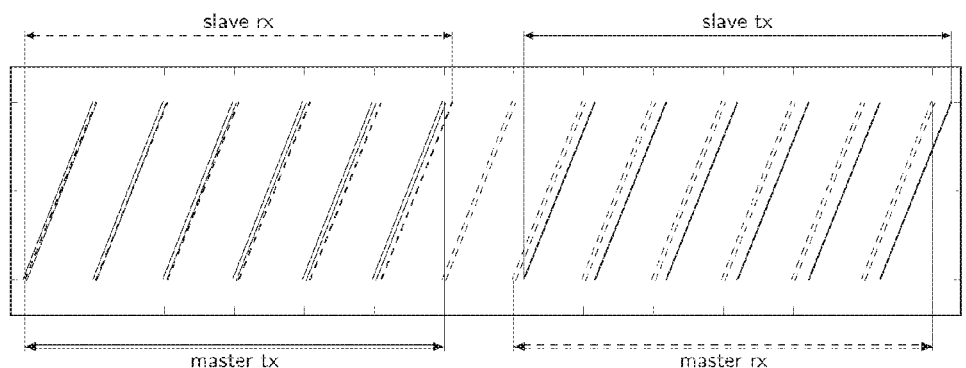

These two effects are illustrated in FIGS. 4a and 4b that plot the instantaneous frequencies of a series of chirps in the master and in the slave. Chirps generated in the master device are represented by double lines, while those pertaining to the slave device are drawn by single lines. Solid lines indicate signal transmitted between master and slave, while dashed line stand for locally signals used for dechirping, for example:

FIG. 4a shows that the scheme is robust to small frequency estimation errors from the slave, FIG. 4b shows the importance of timing compensation.

Returning now to FIG. 6, on the master side, the reception of ranging response (step 231) requires no synchronization steps. The master assumes that frequency and timing are perfectly aligned. The ranging response does not need to embed frequency estimation symbols. The master only estimates a timing, performing exactly the same steps (236 and 240) than the slave in ranging computation without compensation. This simplifies the modem, as the ranging core is common to both master and slave.

Preferably, the invention comprises a diversity combining to improve the reliability and precision of range estimates. By diversity, it is here intended that several ranging measures be performed between the same devices. These measures can be made successively with separated exchanges, in parallel during the same exchange, or both.

Preferably, the combination of diversity is based on received signal strength indication. Measures that correspond to RSSIs which are lower than a given threshold are discarded. Then, remaining measures are averaged to get an initial range estimate. A weighted average of estimates, using RSSI in linear scale as weight, is also possible.

In a possible implementation, the threshold applied is around 6 dB: ranging measures which have an associated RSSI 6 dB lower the maximum RSSI of the measures set are discarded. This threshold comes from experimental data.

If both spatial (i.e antenna diversity) and frequency diversity are used, the threshold is preferably computed for each antenna.

Once the average of selected measures is available, the range estimate is compensated for multipath. The average effect of multipath is to increase the measured time of flight compared to the single path, line of sight case. Since range is better represented by a measure of the direct path, this compensation is important. Since the system of the invention is in general incapable to resolve the temporal structure of the channel (i.e. resolving individual echos) because of its narrow band, proper compensation can improve considerably the reliability the range estimates.

The longer the distance between the devices, the greater the delay spread of the propagation channel. The impact of delay spread is however capped: echoes occurring after a delay longer than the time resolution of the system don't modify the range estimates.

At a very short distance, below a few meters, the power profile of the channel is decaying fast. We observed that the shorter the distance, the lower the impact of multipath. Actually, for the limit case, which is null distance between devices, the direct path dominates a lot the echoes, so that their impact is very small.

This behaviour has been determined from experimental data; FIG. 5 illustrates a possible compensation curve used to extract a true range from a range estimate affected by multipath. Measures using RF cables of various lengths confirmed that radio propagation in the air was the source of this distance dependent ranging bias.

The invention preferably includes automatic adaptations measures, for example rate adaptation, adaptive hopping for diversity, and the ability to perform auto-calibration of a pair of devices in a "find my stuff" application.

Adaptive rate is used to maximize the capacity of a network, or the capacity of a link. The system of the invention is preferably capable to adapt the frequency and/or the bandwidth and/or the spreading factor of the signal based on the channel state.

By doing rate adaptation, the measure rate can be increased if the signal to noise ratio is good enough. Rate adaptation is done with the same mechanisms than the transmission system: the spreading factor is changed; the value of the spreading factor is exchanged using the communication path. Shorter measures can provide higher accuracy thanks to more averaging, track more items, or save power.

Adaptive hopping is a feature which is very useful in particular in the 2.4 GHz ISM band, because it is crowded with many other applications. Since the system of the invention is narrowband, it can offer ranging service even when most of the band is used. This cannot be done by less agile, wider band, systems. The best frequency can be determined by a variety of known methods, and sufficient information on the hopping sequence is transmitted using the communication path.

Figure 5A:
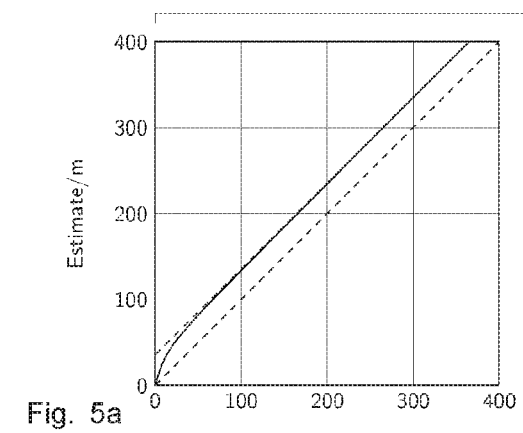
FIGS. 5a and 5b plot a correction function used to estimate a range according to one aspect of the invention.
Figure 5B:
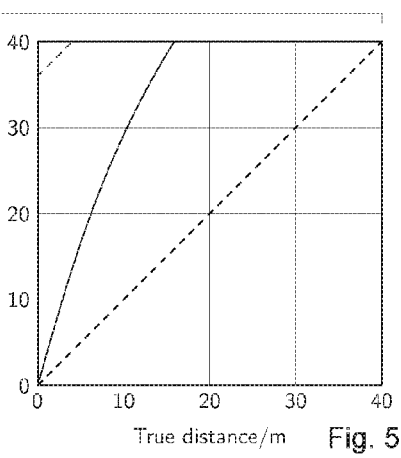

The system of the invention is preferably arranged to auto-calibrate ranging measures, using distance dependent ranging error. As shown in FIGS. 5a, 5b, the slope of estimated range versus distance increases as distance reduces, up to a slope of 5 for very close ranges, for example less than 15 meters. In a typical point to point application, the user is going to aim at a searched person or thing, at walking speed, thus it can be assumed that the rate of change of the true range is more or less constant and limited to, for example 1.5 m/s. Once there is a sudden change in the uncompensated range estimate (before bias compensation described in 2), and if the corresponding speed is too high to be pedestrian speed, the system can deduce that the true range to the searched object is less than 15 meters. This can be used to modify the calibration of the master device, to compensate for a calibration error of the master, or more likely of the slave (searched device). The modified calibration of the master actually improves the calibration of the pair. Conversely, if the range estimate is lower than 15 meters, but if at the same time, the uncompensated distance estimate varies at a pedestrian speed, then the system can detect an error and increase the estimated distance, since for short distances estimations should vary faster. This automatic calibration only happens when devices are close, which is exactly when it is needed. Having automatic calibration in which the rate of change of the estimated range is used as an indication of the true range improves confidence in the system, where devices can be let without ranging activity for long periods of time.

Thanks to the long range the system offers, the invention can operate in highly obstructed conditions. In these situations, the ranging estimate will still be almost as accurate, since it is based on time of flight measures. Then, comparing the range estimate to the average received signal strength; the invention can build and display an obstruction indication. One way to compute this indication is to first compute a path loss exponent, which should be equal to 2 in line of sight. Path loss exponent is such that the receive power is inversely proportional to the distance raised to the power of the exponent. For this, a knowledge of the transmitted power is needed, but this information does not need to be highly accurate, since the obstructions effect is usually dominant. A possible indication of the obstruction is obtained by subtract 2 from the path loss exponent, and reporting this number to the user.

For an application where the user has a hand-held device, the obstruction indication can be a bar growing in size and/or changing colour as obstruction increases. This way, the hand held device can report simultaneously an estimated range, and an estimated obstruction. The obstruction level can be used as a direction hint: outdoors, when obstruction is high it often indicates that the body of the user is obstructing the signal, and facing a different direction can confirm this. Indoors, high obstruction level indicates that the item the user is aiming at is not in the same room/floor. This is very convenient information for this application, as proven by several tests.

Figure 7:
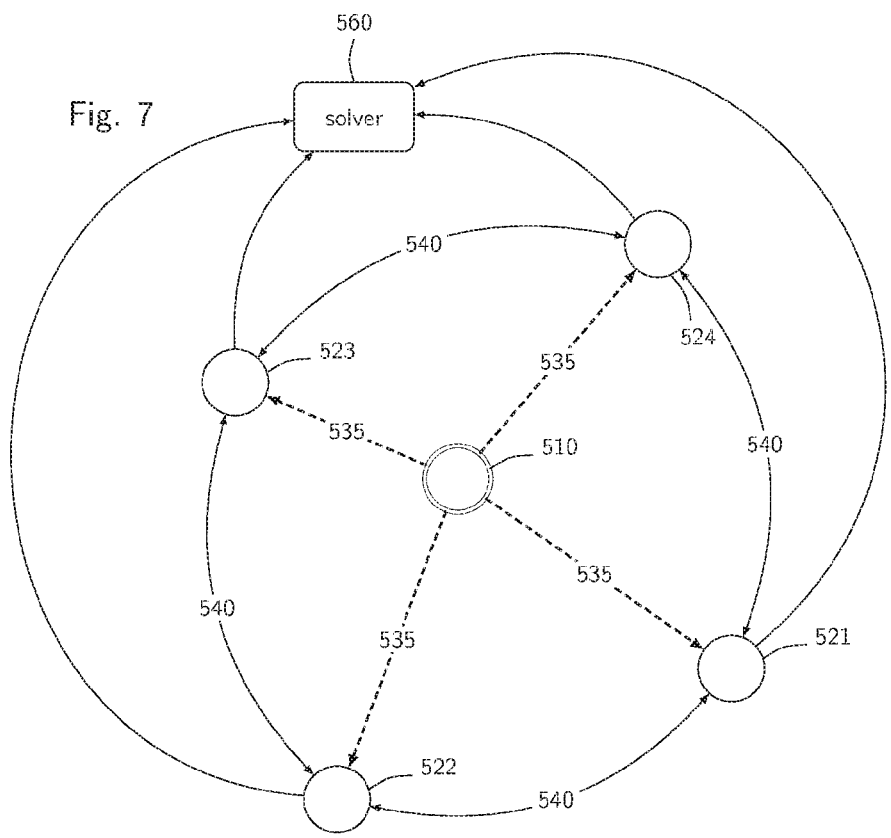
FIGS. 7 and 8 present schematically positioning systems according to the present invention.

FIG. 7 represents a positioning system according to an aspect of the invention that allow the determination of the position of a mobile device 510. Device 510 is capable of communicating with a plurality of positioning devices 521-524 by radio signals comprising a series of chirps as explained above.

The positioning devices 521-524 act as beacons and are capable of communicate by suitable data links 540. Data links 540 can be wireless radio links, for example based also on chip-modulated radio signals, or on any suitable communication standard, or wired links based on electric cables, electric fibres, or any other appropriate data transmission means. Importantly, the data links 540 allow the synchronization of the respective time reference of the devices 521-524, as it is known in the art. The figure represents the positioning devices 521-524 interconnect among them, and mutually synchronizing their clocks but, in a non-represented variant, they could instead synchronize their time references to a common master reference.

Positioning devices 521-524 are preferably fixed, or at least slowly moving, and their locations, or at least their relative locations with respect to one another, are precisely known.

The position system also includes at least one solver device 560 that knows the locations of the positioning devices 521-524, and can exchange data with them, in order to compute the position of the mobile device 510, as it will be explained further on. Even if the solver device 560 is here represented as physically distinct from the positioning devices 521-524 for generality, this is not a limiting feature of the invention, and in fact each of the positioning devices 521-524, or all of them at the same time, could serve as solver, in which case the links 540 could be used both for clock synchronization and data exchange.

Preferably, the mobile device transmits a ranging request 535, for example formatted as in FIG. 3, to all the positioning devices. Each of the positioning devices receives the ranging request 535 and decodes it in the same manner, applying the steps 350-362 of FIG. 6, but each of them will determine a different ranging response offset since each has a different distance from the mobile device 510.

At this point, the positioning method deviates from the previous example in that, instead of generating a ranging response, the offsets are transmitted to the solver device 560, which computes the position of the mobile device 560 with respect to the positioning devices 521-524. To this end, it is required that a sufficient number of positioning devices determine an offset. In a general case, the solver will have to solve a system comprising four unknown: the coordinates x,y,z of the mobile device 510, and the offset $\Delta t$ of its clock, hence at least four offsets form four independent positioning devices need to be determined. Methods of solving such systems are known in the art.

Figure 8:
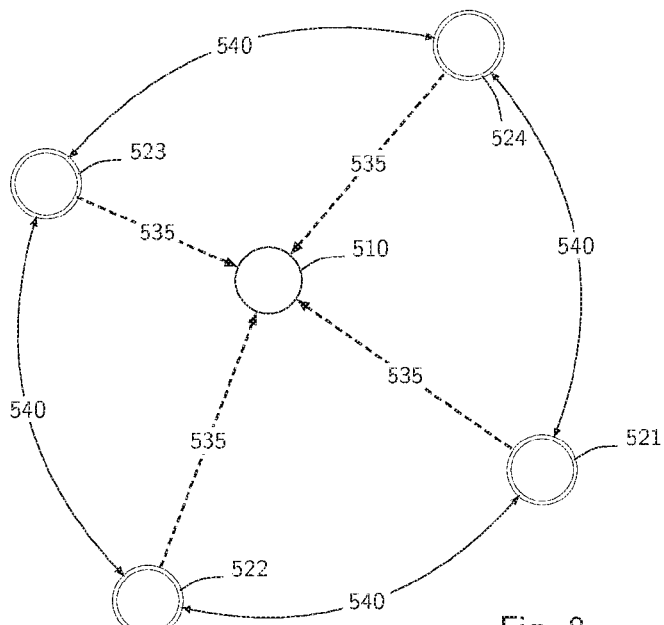

According to the example represented in FIG. 8, a position of a mobile node could be determined in the node itself.

In this case a plurality of fixed positioning beacons 521-524 have their time reference synchronized by the links 540, as mentioned above, and emit simultaneously, or at predetermined time intervals, ranging sequences comprising chirps for example as in FIG. 3. The mobile device 510 can estimate, as explained with reference to the FIG. 6, the relative time offsets. Since the time references of the positioning nodes are synchronous, the mobile device 510 can, provided it determines at least the delays from four independent positioning devices and knows their positions, determine its own coordinates x,y,z and the offset Δt of its clock.

Importantly, in the last two examples, the position of the mobile node 510 is never transmitted and it is known only by the solver 560 or, in the latter, by the mobile device 510.

Narrow Band Access Key Features

The communication devices of the invention comprise a narrow-band bidirectional data transmission interface whose physical layer is organized to fit into a limited portion of the radio spectrum. The devices of the invention preferably employ a frequency division scheme (FDD), such that the physical layer of the narrow-band communication fits, for example, into a 200 kHz uplink band and a 200 kHz downlink band, each divided in a suitable number of sub-channels. Other bandwidths are however possible. The network preferably involves a number of fixed base transceiver stations (BTS) that can communicate with the mobile nodes via the respective radio interface, and among them by wired or wireless data links.

In a typical IoT scenario, the devices deployed are ultra-low power mobile devices (MS) of very low complexity. Preferably the frequency re-use factor among different cells is 1, to totally remove hand-over overhead for the simplest device. All Base Transceiver Stations (BTS) may be configured to demodulate the complete set of sub-channels. A mobile device hence does not have to manage hand-over when changing cell. Inter cell cooperative demodulation is also an enhancement possible given the very narrow bandwidth of the signals to process.

In a possible embodiment of the invention, the network fixed infrastructure could be provided by a telephone operator and be combined with an existing telephone infrastructure. The narrow-band communication could be in a decommissioned GSM channel or any currently unoccupied spectrum in the licensed band owned by the operators. The preferred band of operation is the 700 to 950 MHz band as it simultaneously exhibits good indoor penetration, excellent good propagation, and has small antennas, useful for size-constrained objects.

Simulations and tests have shown that the proposed narrow band approach achieves 20 dB improvement in link budget compared to GSM using only 17 dBm (50 mW) RF output power from the MS at 122 bits/sec. When the path loss allows it, the MS data rate can be in increased up to 7.8 kbits/sec.

The narrow band uplink and downlink channels are arranged to minimize the spectral leakage into the adjacent cellular channels.

Preferably, a spread spectrum (chirp-modulated) beacon signal is constantly broadcasted on the same spectrum block of the narrow band downlink channels. The different modulation schemes adopted permit the cohabitation of the spread-spectrum and the narrow-band signals in the same frequency band, at certain conditions, as it will be explained later. The spread-spectrum allows very fast robust frequency acquisition and alignment of the MS.

The low RF output power allows a fully integrated transceiver to be used in the MS (including the power amplifier and antenna switch). It also allows the use of small and low cost batteries that can only handle very low peak currents.

Narrow-Band Uplink

Preferably. The uplink band of the radio spectrum is organized in a suitable number of sub-channel. In an example, the 200 kHz uplink narrow-band FDMA system could be organized into 72 uplink sub-channels having different widths and symbol rates, as follow:

| nb channels | Channel BW (Hz) | Symbol rate |
|---|---|---|
| 32 | 400 | 244.1 |
| 16 | 800 | 488.3 |
| 8 | 1600 | 976.6 |
| 4 | 3200 | 1953.1 |
| 4 | 6400 | 3906.3 |
| 8 | 12800 | 7812.5 |
| Total uplink spectrum (Hz) | 179200 | |

The above arrangement is selected based on simulations and experience of typical link margin spread in M2M deployments. The repartition can be changed freely as long as the total spectrum usage stays within the allocated bandwidth. Preferably, the widest channels are kept in the centre to minimize spectral leakage. A guard band is allowed on each side to guarantee coexistence with the adjacent cellular uplinks.

Figure 9:
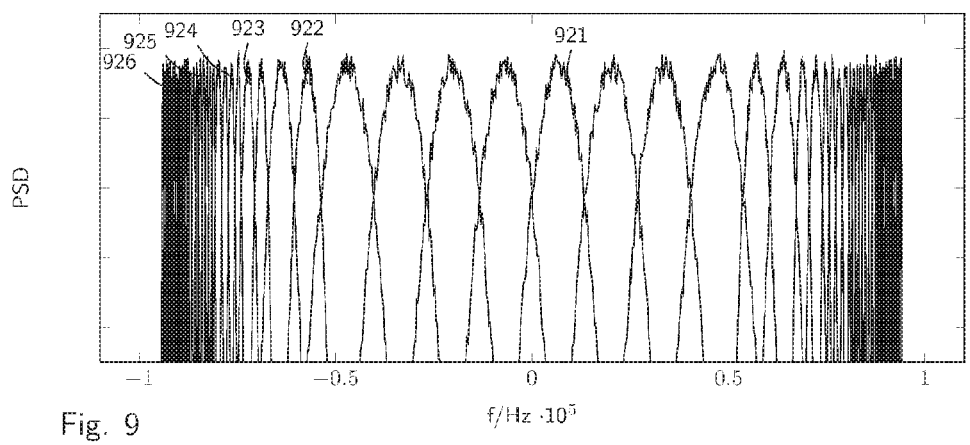
FIG. 9 shows a frequency distribution scheme for a narrowband radio transmission according to an aspect of the invention.
Figure 10:
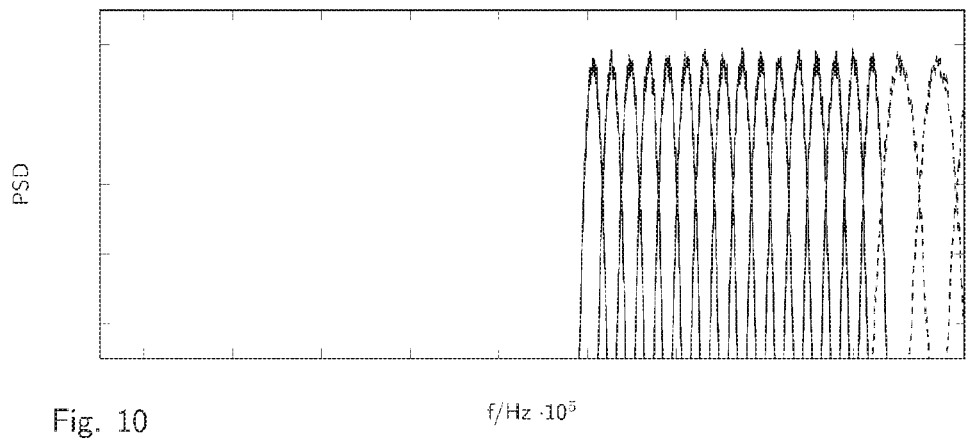
FIG. 10 show a detail of the frequency distribution scheme of FIG. 9.

FIG. 9 illustrates this example distribution: the centre of the band is occupied by the broader, high-capacity channels 921, while the progressively narrower channels 922, 923, 924, 925, 926 are placed at the sides in succession.

This disposition with the narrowest channels on each side and the ones in the centre minimizes spectral leakage. For better illustration, FIG. 9 that shows a portion of the spectrum of the previous plot, with the left first 16 400 Hz channels followed by the first 2 800 Hz channels.

Several modulation schemes could be proposed and implemented in the frame of the invention. In a preferred embodiment, all uplink channels are GMSK modulated with a BT product of 0.3 like GSM. The symbol rate of each channel is equal to the channel bandwidth multiplied by 0.61. The rejection between adjacent channels is better than 80 dB and, therefore, real time power control loop are unnecessary. Advantageously all the required clocks can be derived from a 32 MHz XTAL.

A slow data rate adaptation and/or power control system of the MS could be included in the invention, and would be beneficial for the overall network capacity.

In addition to adaptive data rate and power control, the mobile stations are set to use preferably some channels depending on their link quality. The MS with a good link quality are grouped together; the MS with lower link quality are also grouped together. The grouping is performed for a given bandwidth, and is gradual along the frequency set. For instance, the lower frequency channels get the MS with lowest link quality i.e. lowest link margin or lowest number of receiving base stations, then the higher the frequency the better the MS link quality: higher link margin and or higher number of receiving base stations. This allocation can be made from the network, or autonomously by the MS based on beacon levels and received beacon number. In this variant, the endpoints select a centre frequency for narrow band transmissions that depends on a measure of the link quality.

The advantage of this MS grouping based on link quality is to protect the "weak devices", which are received with a low signal, from "strong devices" signals coming for MS with higher link margin. This way, since the access is ALOHA, strong signals, and weak ones as well, tend to collide together. If strong and weak MSs signals were to collide, there is a high probability that weak MS would never be received, even with the macro-diversity brought by the 1 reuse factor. When a collision occurs between two strong MSs, there is a good probability that one MS signal will be received correctly on one base station, and that the other will be received correctly on another gateway.

This technique can be extended to truly mobile MS, as opposed to fixed position ones: for these nodes, power control will be less efficient, so it is best to move them away from marginal MSs channels.

It is very important, in a collision based medium access, to protect MSs with the lowest probability of success, because the quality of service level is driven by poorest performing MSs. Note that the mechanism detailed here is not what maximizes throughput: for this a random channel choice would be better, but this would prevent the weakest MSs to communicate reliably.

Any of the available error correction codes could be employed within the frame of the invention. In a favourable variant, the error correction code used is a convolutional code with a rate of 1, ¾ or ½. The ¾ rate is obtained by puncturing the ½ rate.

The applicant has developed a demodulation process that can be implemented in the BTS which provides robustness against frequency drift during the frame and does not require pilot symbols. Except for the preamble portion of the uplink frames, all symbols carry data, there are no pilot symbols. Associated with the low current drain in transmit mode and therefore reduced heating effect, this should allow the use of a normal XTAL.

Narrow-Band Downlink

In a preferred example, the downlink 200 kHz block is organized similarly to the uplink except the narrowest channel bandwidth used is 3200 Hz, and the narrow channels are arranged in the centre of the band.

| nb channels | Channel BW | Symbol rate |
|---|---|---|
| 16 | 3200 | 1953.1 |
| 4 | 6400 | 3906.3 |
| 8 | 12800 | 7812.5 |
| Total downlink spectrum | 179200 | Hz |

Preferably, the downlink also features an overlaid spread-spectrum beacon for fast MS frequency and timing acquisition, and the same modulation and coding scheme is used for the uplink and downlink narrow-band sub-channels.

Figure 11:
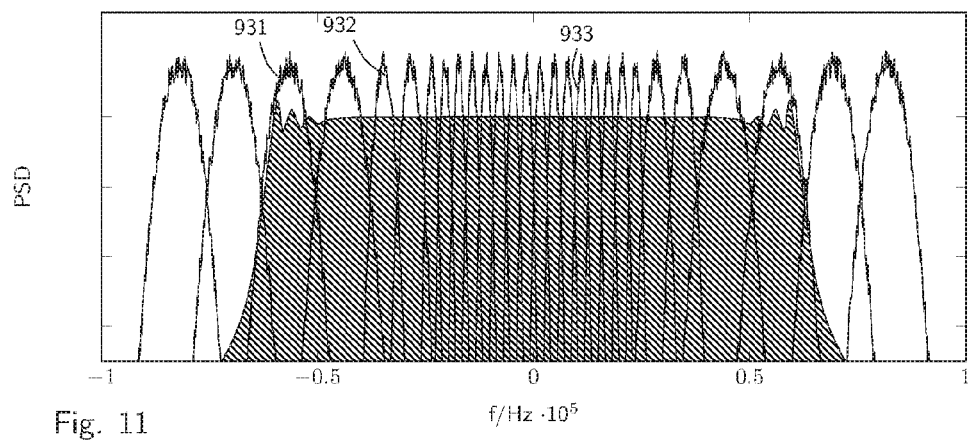
FIG. 11 shows a spread-spectrum signal superimposed to the narrowband distribution scheme of FIG. 9.

The beacon's 3 dB bandwidth is preferably comprised inside the narrow-band downlink spectrum. In a preferred example, it is 125 kHz broad, and centred in the middle of the 200 kHz downlink block, as shown in FIG. 11.

The transmit power of this beacon is set to be under the maximum aggregated downlink power of the overlaid sub-channels using the same spectrum by a suitable margin, for example 7 dB. Tests and simulations have shown that, in these conditions, the beacon signal can be demodulated by the MS with BLER<1% for an SINR of −9.5 dB, hence with a 2.5 dB margin in case all overlaid downlink sub-channel are being transmitted simultaneously.

The transmit power of the spread-spectrum beacon signal is also such that the wider narrow band downlink channels experience a good enough signal to interferer ratio. A good SIR value to receive narrow band GMSK modulation is 10 dB. The interference seen by the endpoint corresponds to the GMSK bandwidth, which is lower than the total CSS interferer. Here, for correct reception, the GMSK bandwidth should be smaller than 3.5 KHz. Preferably, the beacon signal can be selectively deactivated when necessary. For example, the beacon transmission could be stopped, when any of the 6.4 KHz downlink channels 932 is used, or when the most central 12.8 KHz channels 931 are used. The beacon signal can be transmitted at the same time as one or several 3.2 KHz channels 933 are used, in that case, both the beacon and the GMSK channels can be demodulated by endpoints.

For the downlink the widest channels are placed on each side as they exhibit the lowest power spectral density and the dominant out-of-spectral leakage mechanism it expected to be the BTS power amplifier non-linearity.

Beacon

The beacon downlink signal is transmitted using the LoRa modulation. The spreading factor should be chosen to strike a balance between downlink beacon maximum coupling loss and beacon acquisition time (hence energy consumption of the end-device). In a preferred realization, the spreading factor is 128 (SF7) or 512 (SF9) and the bandwidth is 125 kHz. The following table gives an overview of the downlink beacon maximum coupling loss and associated period. Coupling loss well in excess of GSM+20 dB is achievable. Advantageously, this allows small end-devices which cannot implement antenna diversity and might experience deep fading in the downlink spectrum block.

|  | Beacon downlink SF9 | Beacon downlink SF7 |
|---|---|---|
| Transmitter | | |
| (0) Total Tx power (dBm) | 45.0 | 45.0 |
| (1) Tx power per channel (dBm) | 37.0 | 37.0 |
| Receiver | | |
| (2) Thermal noise density (dBm/Hz) | −174.0 | −174.0 |
| (3) Receiver noise figure (dB) | 7.0 | 7.0 |
| (4) Interference margin (dB) | 0.0 | 0.0 |
| (5) Occupied channel bandwidth (Hz) | 62500.0 | 125000.0 |
| (6) Effective noise power = (2) + (3) + (4) + 10 log((5)) (dBm) | −119.0 | −116.0 |
| (7) Required SINR (dB) | −14.5 | −9.5 |
| (8) Receiver sensitivity = (6) + (7) (dBm) | −133.5 | −125.5 |
| Maximum coupling loss (MCL) = (1) − (8) (dB) | 170.5 | 162.5 |
| Beacon period (30 bytes) | 230 mSec | 72 mSec |

The beacon allows the MS to estimate its frequency error with an accuracy of +/−122 Hz at the carrier frequency, (id 0.13 ppm at 900 MHz for example) in 200 mSec. The device XTAL tolerance to instantly acquire the beacon is +/−30 ppm which is the stability achieved by all mass produced XTALs including production variability, temperature and aging. The spread-spectrum beacon also allows ultra-low cost MEMs based time references with +/−200 ppm tolerance, provided a sequential search is performed the first time. The subsequent aging and temperature drift will be in the +/−30 ppm range and are tolerated by the beacon demodulation.

This use of the beacon allows an efficient uplink FDMA access even with ultra-narrow band sub-channels.

The beacon can also carry timing information to enable MS synchronous downlink reception or downlink multicast. The beacon is sent synchronously by all the BTS participating in the network, the required timing alignment between BTS is +/−4 uSec.

Link Budget Analysis: Narrow Band Mode

The table below gives the calculation of the maximum coupling loss for the minimum bit rate of 100 bit/sec
The following parameters are used:
  200 symbol/sec GMSK, BT=0.3 with ½ Viterbi coding
  22 symbol preamble
  20 bytes payload
  1T1R for downlink, 1T1R for uplink
  Packet error rate: 10%
  0.1 ppm frequency drift during transmission
The table also gives the downlink beacon maximum coupling loss assuming SF7 (the fastest available beacon rate).

| | GMSK Uplink 122 b/sec @ 20 dBm | GMSK Uplink 122 b/sec @ 14 dBm | GMSK downlink 976 b/sec | Beacon downlink SF7 |
|---|---|---|---|---|
| Transmitter | | | | |
| (0) Total Tx power (dBm) | 20.0 | 14.0 | 45.0 | 45.0 |
| (1) Tx power per channel (dBm) | 20.0 | 14.0 | 31.0 | 37.0 |
| Receiver | | | | |
| (2) Thermal noise density (dBm/Hz) | −174.0 | −174.0 | −174.0 | −174.0 |
| (3) Receiver noise figure (dB) | 5.0 | 5.0 | 7.0 | 7.0 |
| (4) Interference margin (dB) | 0.0 | 0.0 | 0.0 | 0.0 |
| (5) Occupied channel bandwidth (Hz) | 200.0 | 200.0 | 1600.0 | 125000.0 |
| (6) Effective noise power = (2) + (3) + (4) + 10 log ((5)) (dBm) | −146.0 | −146.0 | −135.0 | −116.0 |
| (7) Required SINR (dB) | 2.0 | 2.0 | 3.0 | −9.5 |
| (8) Receiver sensitivity (6) + (7) (dBm) | −144.0 | −144.0 | −132.0 | −125.5 |
| Maximum coupling loss (MCL) = (1) − (8) (dB) | 164.0 | 158.0 | 163.0 | 162.5 |

(*) A 2 dB improvement is expected on the uplink coupling loss if 1T2R is implemented. Each time the data rate is doubled, it results in a 3 dB degradation of the maximum coupling loss.

Narrow Band Physical Layer Capacity

The uplink capacity of a 200 kHz spectrum block configured as in the example above has been simulated. The following hypothesis have been introduced:
  100 bytes uplink+13 bytes protocol overhead (typical figures form protocols used for small MS)
  ALOHA access in every sub-channel, the uplinks are random and not scheduled
  The BTS antennas have +14 dB front gain, −30 dB back isolation
  Each BTS has 3 sectored antennas
  The down tilt is such that the BTS antennas exhibit 10 db front-gain reduction at twice the inter-site distance
  The end-devices are statics, a slow power control loop can tune 20 dB of attenuation on the end-devices output power keeping at least 10 dB demodulation margin
  The path loss is 120.9+37.6 log 10(Distance)+8 dB log normal random
  On top of this path loss a uniformly distribute 0 to 40 dB additional penetration loss is added, therefore the simulation corresponds to a mix of outdoor to deep indoor devices uniformly spread
  The end-device geographic distribution is uniform
  Frequency reuse of 1, no cell frequency planning
  The End-devices perform Random frequency hopping for each transmission
  The end-devices maximum output is +20 dBm or +14 dBm with −4 dB global antenna efficiency (compact 900 Mhz antenna)
  1T1R antenna configuration, polarization diversity on the BTS side has not been simulated.

Figure 12:
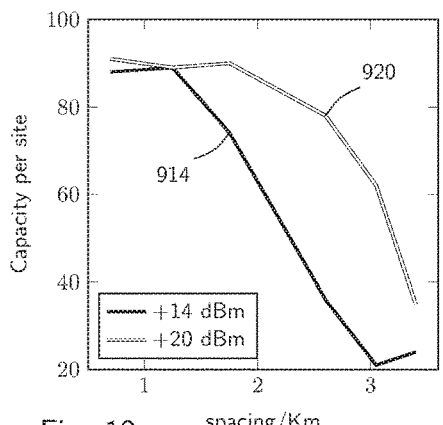
FIG. 12 illustrates by means of a simulated example, the uplink capacity of the narrow-band network of the invention.

For each inter-site distance, the number of uplinks per hour is progressively increased until the 10% weakest end-devices exhibit 20% packet loss rate. The result are summarised in FIG. 12. The data series 914 corresponds to the +14 dBm output power, and the 920 data series is relative to a +20 dBm output power.

Spread-Spectrum Uplink & Downlink

Preferably, the mobile nodes (also indicated as Mobile Stations or MS in the field of cellular communication) and the BTS are also configured to transmit receive a spread-spectrum chirp-modulated signal in a separate 200 kHz FDD spectrum block to achieve data communication with fast moving nodes and positioning of static and mobile nodes.

Preferably, Chirp Spread Spectrum is used both on the uplink and downlink. The reasons for this choice are:
  A sensitivity of −142 dBm with single receive and single transmit on the BTS side and −138 dBm on the MS side. The LoRa modulation has a very good Eb/No efficiency for short packets.
  Constant envelope on transmit side, also for low power.
  Low complexity and power consumption of the MS receiver, in particular for frequency synchronization. The complete modulator/demodulator hardware implementation represents less than 150 kGates.
  Very good performance in high velocity mobile channel, because reception is coherent at the symbol level, but non coherent over the frame duration.

Positioning capability: all uplink transmissions can be located if they can be received by multiple BTS, through Time Difference Of Arrival (TDOA) principles. The measured accuracy is between 10 and 100 meters, depending on propagation conditions and reception spatial diversity.

The network deployment uses a frequency reuse of 1. All uplink (resp downlink) transmissions use the same uplink (resp downlink) 200 kHz block. If several 200 kHz channels are available, different rates are assigned to different channels to maximize the overall capacity.

Figure 13:
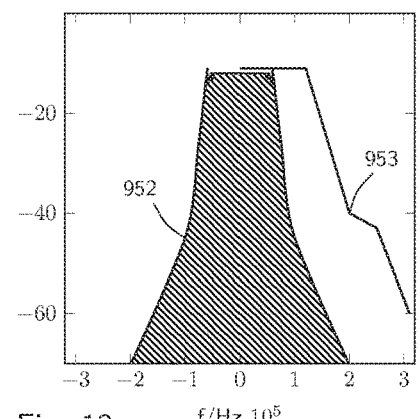
FIG. 13 shows the spread-spectrum bandwidth of the system of the present invention, and the normalized GSM bandwidth.

The spectral power density of the LoRa modulated channel can fits with a comfortable margin in the GSM spectral mask, as shown in FIG. 13. The dashed area 952 corresponds to the power density of the LoRa modulated channel, and the curve 953 is the GSM mask.

Simultaneous uplink using different spreading factors can be demodulated simultaneously by the BTS given the required SNIR conditions are met. Different spreading factors are mutually noise-like. No synchronization whatsoever is required between MS uplinks.

Spread-Spectrum Modulation Details

As already discussed, LoRa modulation can use different simultaneous spreading factors (SF). In a preferred implementation, factors from 32 to 4096 are defined, but this is not a necessary feature of the invention. The chip rate is, for example, 125 Ksps. For each spreading factor, two spreading codes are defined, up chirp and down chirp.

The modulation relies on cyclic shifts of a base chirp, which can encode SF bits. The phase of this symbol does not carry information. This modulation scheme can be seen as orthogonal sequences modulation: one sequence amongst $2^{SF}$ possible is chosen and transmitted.

The symbol durations, and raw data rate before FEC are the following:

| SF | 5 | 6 | 7 | 8 | 9 | 10 | 11 | 12 |
|---|---|---|---|---|---|---|---|---|
| symbol length | 256 us | 512 us | 1 ms | 2 ms | 4 ms | 8 ms | 16 ms | 32 ms |
| Uncoded rate, bps | 19500 | 11700 | 6800 | 3900 | 2200 | 1200 | 670 | 360 |

The frame structure used is that represented in FIG. 3, where each rectangle represents a symbol.

Forward Error Correction

Several error correction scheme are possible. Preferably, a very simple scheme is used, to allow a very simple receiver implementation. In a possible example, a (8, 4) hamming code with parity bit is used in the header, along with diagonal interleaving, over 8 coded symbols. For the payload, the same scheme can be used, but higher rates are preferred, for instance the (5,4) parity code. The SNR performance of the overall scheme are given below, for a 20 bytes data frames at 10% PER. The sensitivity for a single receive antenna is also shown, assuming a noise figure of 5 dB.

Emissions with a different spreading factor than that programmed in the demodulator appear as noise like without any timing synchronization.

Positioning Principle

Figure 14:
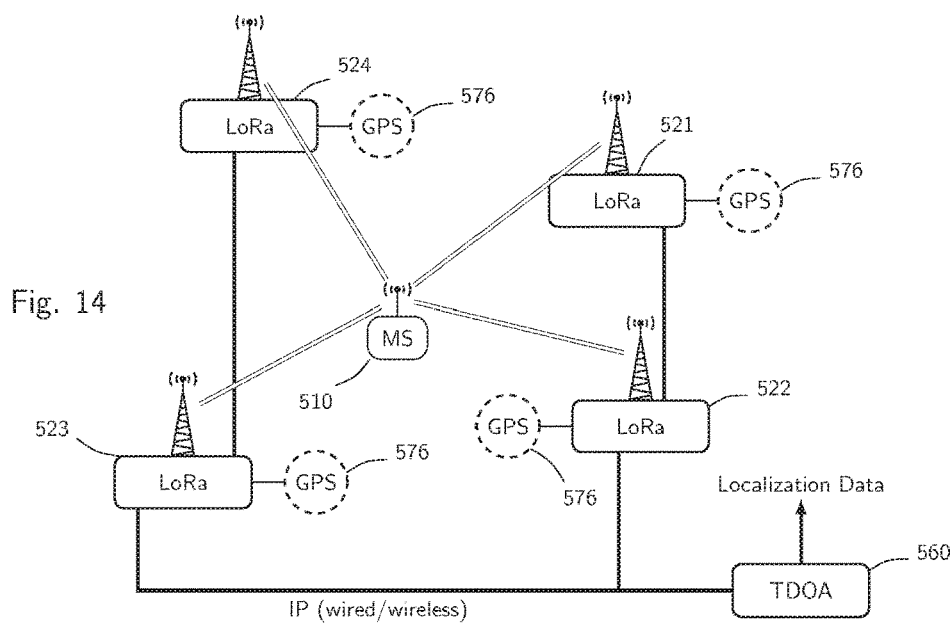
FIG. 14 shows a possible structure of a gateway system according to the present invention and illustrates a positioning system according thereto.

FIG. 14 represents a possible infrastructure arranged for the positioning of mobile nodes 510 according to an aspect of the present invention. In this example, the positioning relies on precise synchronizations of the mobile stations and does not require any downlink. The mobile node 510 emits a chirp-modulated LoRa ranging signal that is received by a plurality of receiving stations 521-524. In a possible positioning mode, the receiving stations have a common time reference, for example the GPS-synchronised clocks 576. The receiving stations receive the signal from the mobile station 510 and record the absolute of reception. This time-stamping is performed over the preamble part of the frame only, for example on the symbols 411, 412, 413, 414 of a frame structured as in FIG. 3.

The spectral properties of chirp-modulated signal allow, as explained above, a very fine estimation of the frequency shift, which is enough to estimate the Doppler speed. Frequency shift estimations from several stations can be combined to determine or estimate the velocity and heading of the mobile node device 510. The TDOA solver 560 is connected to the receiving stations by a suitable wired or wireless connection, for example an IP connection, and receives as input for each receiving antenna (and each polarization): precise time of arrival, RSSI, estimated frequency error, and sector information. The accuracy is mainly limited by multi-path and is between 10 m to 100 m. Outdoor accuracy is better than indoor. As soon as signal level is 10 dB above demodulation threshold, the timestamp accuracy is driven by the multipath impairments and GPS timing reference accuracy. In direct line of sight, the time-stamp accuracy measured is around 35 ns RMS for a single measurement, which translates to 3 meters RMS positioning accuracy. Averaging over several transmissions can further reduce the uncertainty. Frequency hopping between several 200 kHz channels also improves performance by bringing channel diversity.

Spread-Spectrum Data & Positioning Capacity Evaluation

Uplink

The Uplink performances of the LoRa-modulated uplink channel (from the mobile nodes to the base stations) have been simulated assuming a single uplink 200 kHz channel, with all base stations tuned to the same frequency (frequency re-use of 1), no power control, or adaptive data rate. Each node selects randomly a spreading factor of 5, 6 or 7, with SF7 twice as likely as SF6, in turn twice as likely as SF5. Collisions occur, and simulation increases the load until collision rate reaches 10%. The frames payload is 20 bytes. This use case is representative of outdoor and mild-indoor tracking. At the target load, 80% of collisions are within the same spreading code, and 20% are caused by other codes interference.

It is possible increase the link margin by about 12.5 dB by using spreading factor 10, 11, 12 instead of 5, 6, 7, which would confer better penetration to reach deep indoor nodes,

| SF | 5 | 6 | 7 | 8 | 9 | 10 | 11 | 12 |
|---|---|---|---|---|---|---|---|---|
| Info rate | 15600 | 9400 | 5500 | 3100 | 1800 | 1000 | 530 | 290 |
| Required SINR | −4.5 dB | −7 dB | −9.5 dB | −12 dB | −14.5 dB | −17 dB | −19.5 dB | −22 dB |
| Sensitivity (dBm) | −122.5 | −125 | −127.5 | −130 | −132.5 | −135 | −137.5 | −140 | at the expense of a 32-fold reduced network capacity. Preferably, this mode should be reserved for scheduled traffic, for instance to position on demand a lost, deep indoor item.

Figure 15A:
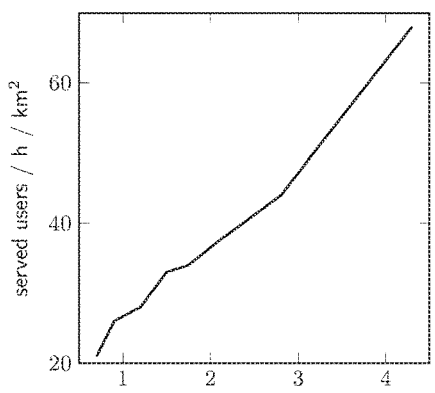
FIGS. 15a-b and 16 show the capacity of a wireless network.
Figure 15B:
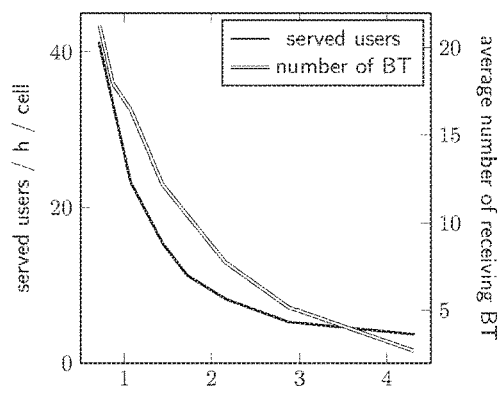

FIGS. 15a-b plot the number of users served and the average number of receiving BTS in function of the inter-site distance. The number is quickly above 5, meaning TDOA solver operates on an over-determined system.

Downlink

In the same scenario, the downlink capacity. It is possible to transmit at the same time SF5, SF6, SF7, assuming SF6 frames have a power offset of −2.1 dB, and SF7 a power offset of −4.0 dB. This way, all 3 rates can be received with a SIR margin of 3.4 dB. Assuming the downlinks are centrally scheduled by the network, such that one quarter of stations transmit at a given time, the downlink capacity of the above scenario is 100 000 served users per hour per base station (20 bytes frames).

Link Budget Analysis: LoRa Spread-Spectrum Mode

The following table gives the calculation of the maximum coupling loss for the LoRa minimum bit rate of 290 bit/sec. The following parameters are used:

125 kHz BW LoRa modulation
20 bytes payload
1T1R for downlink, 1T1R for uplink
Packet error rate: 10%
0.5 ppm frequency drift during transmission
The BTS transmits up to 4 different spreading factors simultaneously The UE key features are summarized in the following table. The current consumptions are independent of the modulation (LoRa or narrow band GMSK):

| | |
|---|---|
| Frequency of operation (*) | 150 MHz to 1 GHz |
| TX current from battery @ 10 dBm | 18 mA |
| TX current from battery @ 14 dBm | 30 mA |
| TX current from battery @ 20 dBm | 85 mA |
| RX current in LORA or GMSK mode | 5.5 mA |
| Sleep with RTC on and memory retention | 1.5 uA |
| Sleep without RTC and memory retention (asynchronous access only) | 500 nA |

(*) the antenna matching is band specific

Battery Life

All scenarios include a constant 1.5 uA platform leakage. The following battery capacity is required for an hourly 100 bytes uplink and an operating life of 10 years.

| | LoRa uplink 290 bit/sec @ 20 dBm | LoRa uplink 5.5 kbit @ 20 dBm | LoRa downlink 290 bit/sec @ 20 dBm | LoRa downlink 5.5 kbit @ 20 dBm |
|---|---|---|---|---|
| Transmitter | | | | |
| (0) Total Tx power (dBm) | 20.0 | 20.0 | 28.0 | 28.0 |
| (1) Tx power per channel (dBm) | 20.0 | 20.0 | 22.0 | 22.0 |
| Receiver | | | | |
| (2) Thermal noise density (dBm/Hz) | −174.0 | −174.0 | −174.0 | −174.0 |
| (3) Receiver noise figure (dB) | 5.0 | 5.0 | 7.0 | 7.0 |
| (4) Interference margin (dB) | 0.0 | 0.0 | 0.0 | 0.0 |
| (5) Occupied channel bandwidth (Hz) | 125000.0 | 125000.0 | 125000.0 | 125000.0 |
| (6) Effective noise power = (2) + (3) + (4) + 10 log((5)) (dBm) | −118.0 | −118.0 | −116.0 | −116.0 |
| (7) Required SINR (dB) | −22.0 | −9.5 | −22.0 | −9.0 |
| (8) Receiver sensitivity = (6) + (7) (dBm) | −140.0 | −127.5 | −138.0 | −125.0 |
| Maximum coupling loss (MCL) = (1) − (8) (dB) | 160.0(*) | 147.5 | 160.0(*) | 147.0 |

(*) A 2 dB improvement is expected on the uplink coupling loss if 1T2R is implemented.
(**) Symmetrical data rates are considered for uplink and downlink to minimize the required Transmit power for the BTS. It is off course possible to use a higher data rate on the downlink if the output End-Device Implementation If the maximum output power of the UE device is <=20 dBm the solution can be fully integrated in a single chip including the protocol stack and a simple user application.

The UE then consists of the SOC, a low cost XTAL, a 32 kHz watch crystal for time keeping, an optional SAW filter on the receiver path, an optional antenna switch (only required if the design includes a SAW filter).

An existing radio transceiver integrating the entire physical layer presented in this proposal (both LoRa spread-spectrum and narrow band GMSK, for both uplink and downlink) and uses 5 mm2 in 90 nm CMOS technology. The cost of this device is <$1.

TABLE

Hourly 100 bytes uplink + acknowledge

| Mode | Coupling loss | Battery cap |
|---|---|---|
| LoRa 290 bit/sec @ 20 dBm | 160 dB | 6.3 A/h (*) |
| LoRa 5.5 kbit/sec @ 20 dBm | 147 dB | 460 mA/h (*) |
| GMSK 100 bit/sec @ 20 dBm | 163 dB | 18 A/h (*) |
| GMSK 3.9 kbit/sec @ 20 dBm | 147 dB | 600 mA/h (*) |
| GMSK 3.9 kbit/sec | 141 dB | 290 mA/h (**) |

TABLE-continued

Hourly 100 bytes uplink + acknowledge

| Mode | Coupling loss | Battery cap |
|---|---|---|
| @ 14 dBm GMSK 3.9 kbit/sec @ 14 dBm no RTC | 141 dB | 200 mA/h |

(*) 10 years of operation can be attained with a specific low self-discharge battery chemistry which however are not compatible with the current pulses required by the +20 dBm transmission. For this mode of operation, a super-cap or HLC cell can be added in parallel with the battery. The operation at +14 dBm is possible without parallel element and enables lower cost for the UE.
(**) for that scenario the platform RTC current and leakage start to contribute significantly. The same scenario without RTC supposing totally asynchronous access is also given for information.

The following table gives the required battery capacity for positioning operation. In that case the payload to be transported is supposed to be 10 bytes as the main information expected is the position of the device. The device operates at +14 dBm as positioning in the 5% most difficult deep indoor situation is not representative of the majority of applications.

TABLE 1

Hourly 10 bytes uplink + positioning + acknowledge

| Mode | Coupling loss | Battery cap | |
|---|---|---|---|
| LoRa 290 bit/sec @ 14 dBm | 154 dB | 450 mA/h | Indoor positioning |
| LoRa 5.5 kbit/sec @ 14 dBm with RTC (*) | 141 dB | <150 mA/h | Outdoor fast moving positioning |
| LoRa 5.5 kbit/sec @ 14 dBm without RTC | 141 dB | <100 mA/h | Outdoor fast moving positioning |

(*) for that mode the platform leakagae of 1.5 uA becomes dominant. Removing the 32 kHz RTC lowers this current by 1 uA and nearly halves the current consumption. This is of course only relevant if the platform micro-controller and associated memory leakage is kept to a minimum. The assumption here is an ARM M0 core with 128 kByte Flash.

The main contributor to determine the battery life will be the complexity of the channel access protocol and in particular whether the device can perform asynchronous random uplinks or if all transactions have to be scheduled. The numbers given here assume a short beacon acquisition to perform frequency alignment followed by a non-scheduled uplink and an acknowledge reception.

Modulation Performance

Figure 16:
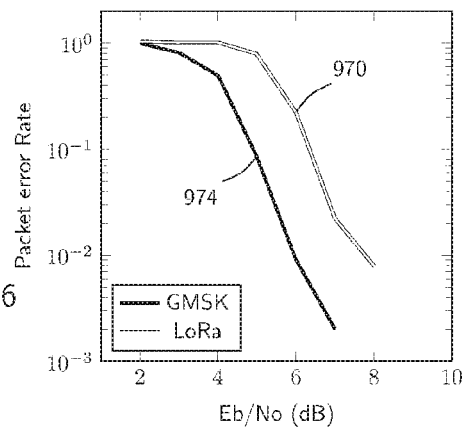

The two modulation used in this PHY layer proposal have very comparable performances. FIG. 16 plots the packet error rate vs energy per bit performance of the narrow-band GMSK with ½ Viterbi encoding to the LoRa spread-spectrum modulation. Independently of the modulation used, the maximum link budget is only a function of the data rate used.

The present invention allows:
- A spectrally efficient narrow-band ultra-low power communication channel with >160 dB coupling loss.
- A spread-spectrum, fast-fading resistant, mobile end-device positioning with >160 dB coupling loss.
- The connection of extremely low power objects powered by <500 mA/h batteries.

This is achieved through two distinct physical layers each operating in a GSM like 200 kHz FDD blocks of spectrum. Multiple blocks can be used for increased capacity.

With GSM like coverage, a device can report 100 bytes every hour during 10 years using less than 200 mA/h from a Lithium primary cell. This is only possible under the assumption that a very simple asynchronous access protocol is allowed that does not require complex scheduling.

Localization is one key enabler for the Internet of Things IoT. Low throughput network, such as LoRa, are very well suited to address the low power, long battery life, long range and low cost segment of IoT.

In a variant, the positioning requires only a transmission from the end nodes, and is carried out in the network servers. This helps keeping nodes complexity low, and is advantageous in terms of security, because it is unlikely that a transmit-only node should be jammed for a plurality of receiving stations.

Ranging-Spy Based Self-Localization LoRa Network

Both power consumption and capacity motivate the design of system with listening-only nodes.

- On the power consumption side, there is a huge difference between transmitting power and receiving power. The consumption ratio can reach 20 or more, when transmitting power of 20 dBm or more are required.
- On the capacity side, it is clear that a system where base stations broadcast localization enabling frames maximizes the self-localization capacity. If end-points don't need to report back their location, then this capacity is actually unlimited.
- However, self-locating end-points will have a higher complexity than data only capable end-points.

Figure 17:
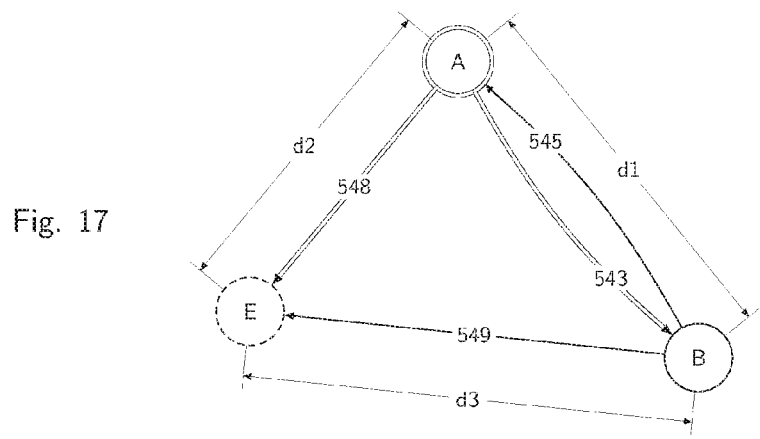
FIG. 17 illustrates a passive ("spy") ranging and positioning method.

The principle is to have nodes being in "ranging spy mode", listening to regular ranging exchanges between base stations. FIG. 17 illustrates the principle of this ranging mode: "A" and "B" are two base stations, whose positions are known, between which LoRa Ranging packets are exchanged. Specifically, "A" acts as a ranging master and sends a LoRa-modulated ranging request message 543 to "B", which replies with a which a LoRa-modulated reply 545. Since the exchanges are between base stations, distance d1 is known, and ranging master and slave positions are known too. The result of ranging exchange, i.e. time of flight measure, can be broadcasted too, which is a more direct way to compensate for propagation between stations than the knowledge of d1. The mobile node "E" receives also the ranging request (arrow 548) and the reply (arrow 549) and determines, using the timing properties of the LoRa Modulation, the difference of propagation time d3−d2. Importantly, as explained in EP2449690, the time difference computed by the node E is not affected by drift and errors of its internal time reference, but has the same precision of the time reference of the master node "A". Each ranging spy time difference can locate the node on a d3−d2=constant curve. This curve is half a hyperbola. Solving for localization can be performed by Time Difference Of Arrival techniques or other known algorithms.

What is unique in this arrangement is that it does not require base stations synchronization. So, it can be used advantageously in locations where GPS is not available to base stations or, to provide a system that is not dependent from GPS availability.

Our tests show that a fair amount of diversity considerably improves positioning performance. Diversity can be antenna diversity, or frequency diversity. Importantly, out tests have shown that diversity of antennas at the transmission site alone already provides an appreciable increase in precision, while multiple antennas at the endpoints (the 'E' node of FIG. 17) is not an absolute necessity. Selecting different antennas and frequency at either master (A) or slave (B) end, end-points receive the messages 548, 549 under different propagation conditions. Preferably, the master-slave A,B pair provides diversity, i.e. repeat exchanges over time, over different antennas and/or frequencies. The result of previous ranging exchange that uses the same parameters can be embedded in the header of ranging request frame, alternatively the average of previous results can be embedded. This is a convenient way to broadcast the ranging result, in case a single slave responds.

Thus, according to this aspect of the invention, the network is so organised that base stations exchange ranging requests and responses between them, and the mobile nodes determine their position by passively listening to the ranging requests and responses, possibly also based on a knowledge of the base stations' position, whereby the positions could either be known beforehand to the mobile nodes, available in a database, or broadcast by the base stations.

The exchange of ranging requests and replies could be random, or according to a plan. Preferably, the network planning is such that close base stations do not perform ranging exchanges at the same time over the same frequencies, to avoid collisions. Also, the base stations in the exchange should not be too close, because the precision in the localization of the 'E' node is determined, among others, by the length of the A-B baseline. Co-location, in particular, is forbidden. If the network cells are laid according to a regular grid, or if the inter-cell distance is distributed around a defined average grid size, it has been found preferable that the exchanges be between base stations spaced by twice the average network grid size.

Preferably, locally ranging exchanges between different station pairs should not occur at the same time, to allow end-points to listen to all exchanges. Being broadcast, controlled by the network, the ranging exchanges have much higher capacity per unit of time, because collisions can be avoided. Of course, we need to respect the duty cycle limits when they apply.

Figure 18:
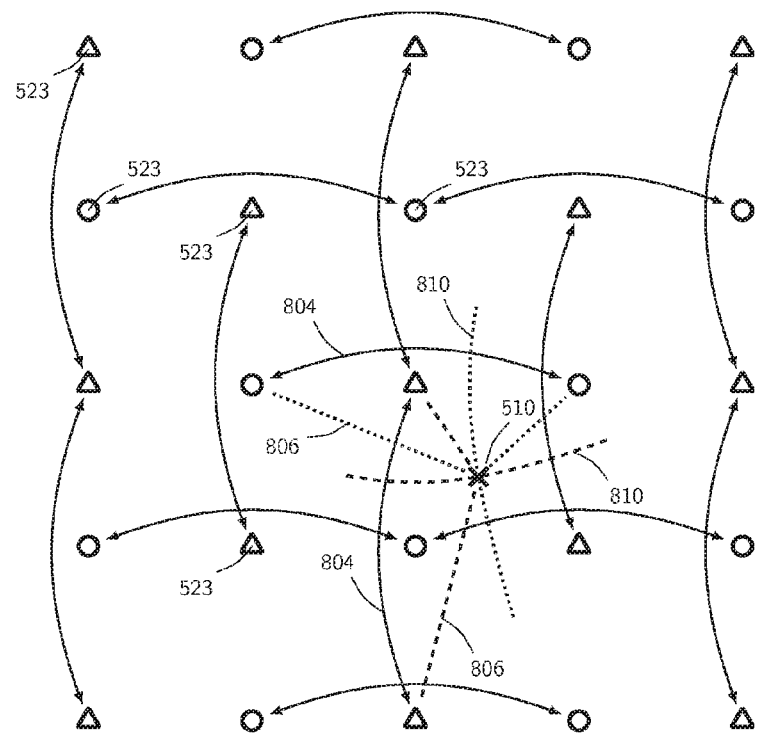
FIG. 18 illustrates a possible network planning schema that creates a plurality of distributes, direction-independent positioning baselines.

It is particularly desirable that the arrangement of ranging pairs should be such that at each location, pairs exist at least in 2 directions, example north-south and east-west. This is to make hyperbolas intersects more reliable. FIG. 18 illustrates a possible network planning that is favourable to passive positioning. Here, the base stations, or gateways 523 (not all the gateways are marked) are arranged in a regular grid, but the arrangement would be successful even if they were more or less randomly distributed. The gateway are paired in a manner that they do ranging exchanges 804 (not all the exchanges are marked) either with a partner in a first direction, for example a north-south direction (triangles) or in another independent direction, for example the east-west direction (circles). The positioning exchanged are planned in such a way that they do not happen simultaneously, or at least they do not happen simultaneously between pairs that are so close to be simultaneously receivable by an end node.

A mobile end node 510 (cross) can receive passively ranging exchanges 806 (not all the reception lines are marked) from several different stations, arranged along a plurality of baselines, differently oriented. In the example of FIG. 18, the mobile node can compute time differences of arrival from signal emitted at the end of at least four different baselines, two horizontal and two vertical, and in this way determine its position. Each pair of ranging signals received from the opposite ends of a baseline locates the mobile node on a line of position 810 that is, in general, a branch of a hyperbola. The disposition of this variant ensures that the mobile node is localised by the intersection of a suitable number of hyperbolas. Since the baselines are oriented along different directions, for example close to a right angle, the corresponding lines of position cross likewise, for example also close to a right angle. This improves the localization's precision.

The invention does not require that all gateways be part of ranging pairs. In fact, it may be advantageous, in term of position database simplification and data transfer reduction, if only a subset of the gateway take part to ranging exchanges.

The ranging request frame includes both ranging slave ID, and ranging master ID. This is a difference from the standard LoRa ranging frame, however for some spreading factors there are bits available for master ID.

The invention does not require that the endpoint compute their location entirely on their own, either, although they can do that if they have knowledge of the base station positions. In a variant of the invention, however, the end-points that require localization will transmit time differences along with RSSIs to the network infrastructure, and their location will be computed for them. Preferably, a first step of filtering is carried out in the end nodes, which need report only one time difference value, average RSSIs and IDs for each ranging pairs.

It is also possible, and advantageous in term of bandwidth use, to have several gateways respond to the same ranging request. The responses occur at the same time, but they do not overlap in the chirp space because they are deliberately shifted in time by a delay that is generated in the slave (B) node. The shift can be part of network planning. For example, the shift can be 0 for the gateway to the north, T/4 for the gateway to the East, T/2 for the gateway to the South, and 3*T/4 for the gateway to the West. At SF7, 125 KHz bandwidth, T/4 corresponds to 32 samples, that is 76 Km at speed of light. Gateways spacing will be smaller than this, so no end-point can get a confusion: North response will always be received before East response, etc. This means there is not even a need to identify explicitly which gateway responds. Other shifting schemes can be devises in the frame of the invention, it being understood that the shifts are either predetermined or algorithmically derivable for each ranging exchange, such that the time difference of arrival at the end node (E) can be determined.

Figure 19:
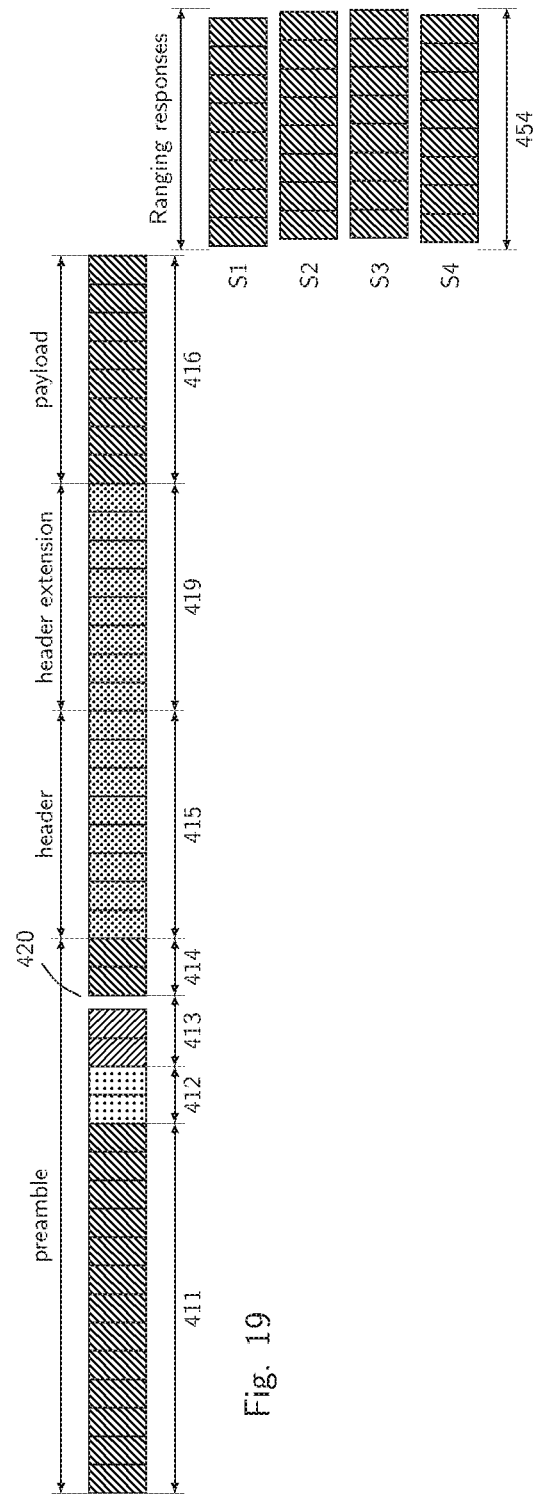
FIG. 19 illustrates a structure of a broadcast ranging frame based on the chirp spread-spectrum modulation.

The ranging frame structure is shown in FIG. 19. This format is not specific to ranging spy usage. The message include a preamble that is analogous to that of the chirp frame presented in FIG. 3, and whose signals have the same function. The first part 411 contains a succession of unmodulated chirps that serve to signal detection: upon reception of this succession of identical unmodulated (i.e. unshifted) chirps, the receive units will prepare themselves, for example waking the necessary hardware resources that may be in a low-power state. The detection sequence 411 also allows a first synchronization of the end-point time reference. The detection sequence is preferably followed by frame synchronization symbols 412, frequency synchronization symbols 413, silence pause 42 and frequency synchronization symbols 414, for the purposes explained with reference to FIG. 3.

The header 415, 419 contains an indication that the message is a ranging request, and a code (ID) that allows the identification of the master node and, optionally of the slave or slaves whose responses are requested. The ranging payload 416 may consist in a series of unmodulated chirps that are used, as detailed in EP2449690 to generate synchronized ranging responses in the targeted slave gateways.

The responses 454 from the targeted gateways S1-S4 are superposed, but are shifted from one another by an amount resulting from the propagation and from an internal delay that is known or can be determined. Accordingly, they are not overlapping in chirp space and can be demodulated independently. The master gateway can determine the range to the targeted slaves and also passive 'spy' end nodes can determine their position by listening to the data transmitted by the master and to the responses given by the slaves.

Beacons Based Self-Localization LoRa Network

According to another possible aspect of the invention, frames, also called here 'beacons' are modified to enable end-point self localization. The modification consists in adding a given number of additional symbols, for example 8, at the end of a frame. The localization from the node allows much more capacity, but requires new chips.

Figure 20:
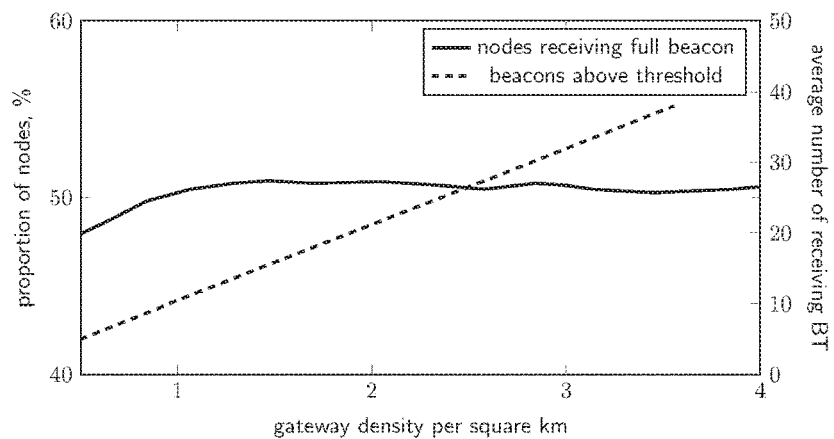
FIG. 20 shows the probabilities of beacon reception and collision according to an aspect of the present invention.

The additional symbols are also used by receiver to identify gateways. In a LoRa network where beacons occur at the same time, 50% of nodes experience a collision between 2 or more beacons, without one being significantly stronger than the others. On average, a node receives many beacons and, insofar as they are mostly identical, and synchronous, this is not a problem. However, for the cell ID section, collisions prevent good decoding, unless one beacon is significantly stronger (8 dB is a typical threshold value) than all the others. FIG. 20 illustrates this situation: the average number of beacons above reception threshold (dashed line) increases regularly with the density of gateways and, at the same time, the proportion of nodes decoding fully one beacon stabilizes at about 50% (full line).

Figure 21:
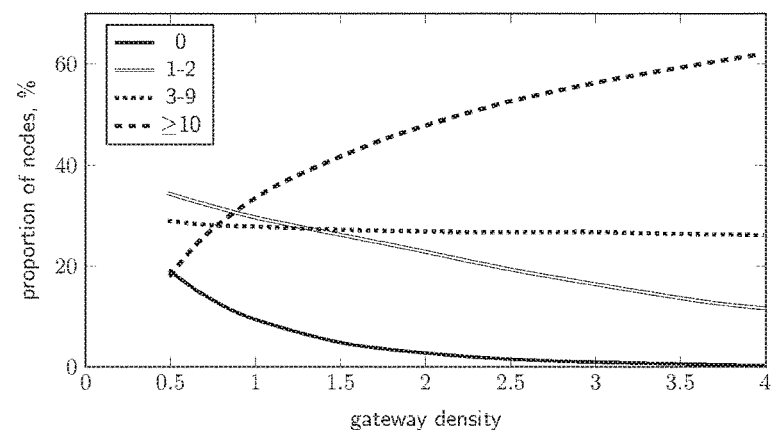
FIG. 21 illustrates the average number of end-nodes that can decode a beacon frame, as a function of cell density.

Assuming a spreading factor of 512 (SF9) for the beacons, the proportion of nodes than can receive several beacons, in a typical deployment, is high: with 1 km spacing, which is the full coverage minimum, 55% of nodes can receive 3 base stations or more, and with 500 meters spacing, this goes up to 75%. FIG. 21 illustrates the result of a simulation and shows, as a function of the gateway density, the number of end nodes that receive, in average, none, one or two, between three and nine, ten or more base stations.

Figure 22:
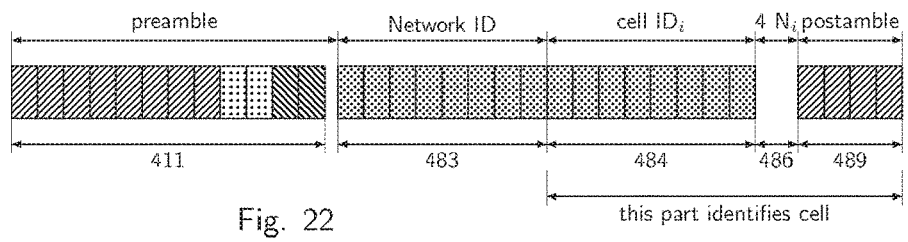
FIG. 22 is a ranging frame with a postamble according to an aspect of the present invention.
Figure 23:
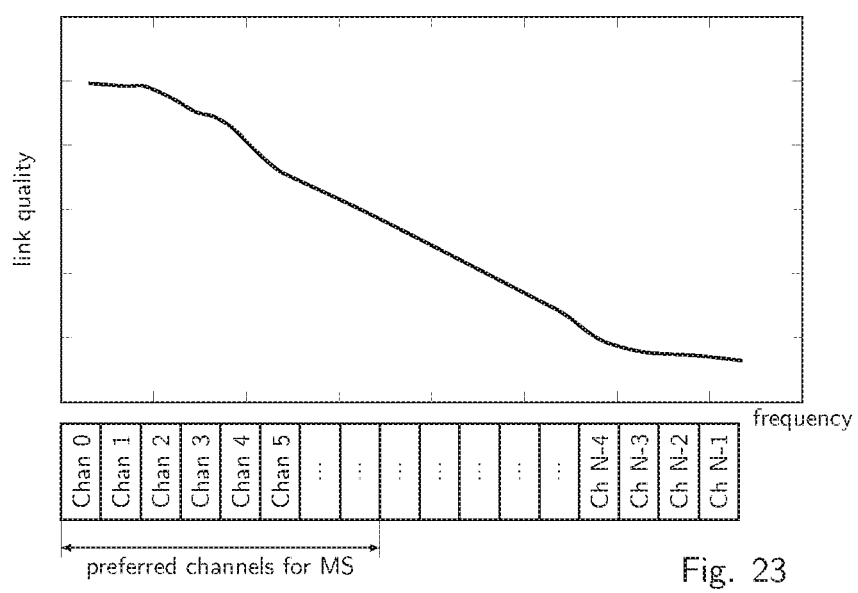
FIG. 23 illustrates a method of allocating narrow bandwidth channels to mobile nodes dependent from the link quality, according to an aspect of the invention.

Here are details of the beacon frame structure will be now detailed with reference to FIG. 22: the postamble 489 includes additional symbols that, preferably, are not modulated and use the same spreading factor than the beacon. They can be positive slope chirps, negative slope chirps, or a mix of both. A mix of positive and negative slopes allows fine frequency error estimation at the node, because on this part of the beacon the individual contributions from several stations can be distinguished without ambiguity.

Fewer symbols are possible, if a spreading factor higher than 9 is used for beacons. Indeed, eight symbols at SF9 take the same amount of memory as one symbol at SF12. Since endpoints have at least a memory of two SF12 symbols, eight symbols of SF9 do not increase the end-points memory requirements.

For a given gateway, all symbols are time-shifted by a given delay 486, of 4*Ni samples. Preferably, Ni is the result of a network planning, among gateways. Locally a single delay is associated to a single gateway. With SF9, up to 128 values are possible for Ni, which makes the above easy (in 2D, network planning can be performed with three elements).

For pure self-localization, nodes need to know the local network planning and the delays values Ni of the relevant gateways. This can be obtained by a local broadcast. Another solution is for the nodes to report only the timestamps for each time shifts they were able to receive.

Now details on beacons reception by an end node:
The beginning of reception is normal
Cell ID 484 may not be received correctly, in case for example of collision The postamble symbols 489 are stored in memory. Since this is equivalent, in memory space to one SF12 symbol, this operation does not require additional memory resources in the end node.

The postamble symbols are dechirped and processed by a FFT. High FFT output bins identify the delay value of the postamble and allow the determination of the cells in range.

Several methods are available to achieve the required time precision. For example, For each detected cell, compute a dechirp then DFT over 3/5 bins, average over 7 or 8 symbols, aligning symbols to detected time shift first and applying timing drift compensation. Several Fourier transform interpolation can be usefully applied.

The timestamps correspond to transmissions received at the same time, with the same residual frequency error. This means that fine frequency error compensation is not required, and simpler algorithms than for gateways timestamping (part A) are equally accurate.

According to an important aspect of the invention, the LoRa Chirp-spread spectrum signals transmitted by the beacon or beacons can be promptly detected and demodulated by the end-nodes without prior synchronization. On the contrary, the end nodes can listen to CSS broadcast transmission from the beacons within reach and synchronize themselves both in time and frequency with the network time reference. This brings several important advantages:

Low-cost nodes used in IoT application cannot in general afford a high-quality temperature oscillator. By the method above outlined, the nodes can synchronize themselves quickly and inexpensively to the network time as needed.

Since the nodes are synchronized in frequency, Narrow-band or Ultra-Narrow-Band downlink messages can be demodulated easily and promptly, with no or little searching in the frequency band. This is advantageous both in term of network capacity and of battery usage.

On the uplink side, the node, once it has achieved frequency synchronization by listening to the CSS timing message, can promptly transmit narrow-band or ultra-narrow band messages at the required frequency without interfering with neighboring channels.

As already explained, the time synchronization can usefully be used for determining ranges between the end nodes and the beacons, and nodes' positions, but also to improve reception and transmission of narrow-band and ultra-narrow band signals, when these are limited to specific time intervals.

The invention claimed is:

1. A wireless communication network including a plurality of nodes, each node having a time reference, and being arranged for receiving and transmitting chirp-modulated radio signals, wherein the phase of the chirps is a continuous function, such that a node receiving the radio signal can align its time reference with that of a node transmitting the radio signal, wherein at least a subset of the nodes, acting as master, are arranged to broadcast a chirp-modulated ranging request, and at least a subset of the nodes, acting as slave, are arranged to receive the ranging requests and reply with a chirp-modulated ranging response, and at least one mobile node is operatively arranged to receive both the ranging requests of the masters and the ranging responses of the slaves, and determine for each pair of one ranging request and one ranging reply, a difference of the propagation time between the master and the mobile node minus the propagation time between the slave and the mobile node, whereby the position of the mobile node is determined, based on said difference of propagation times and on the positions of said masters and slaves.

2. The wireless communication network of claim 1, wherein the ranging requests and ranging replies are exchanged between the masters and the slaves repeatedly over time, and/or through different antennas, and/or frequencies.

3. The wireless communication network of claim 1, wherein the ranging request includes an identification of the master and an identification of the slave.

4. The wireless network of claim 1, in which a plurality of the subset of nodes acting as slave are arranged to reply to one ranging request transmitted by one master.

5. The wireless network of claim 4, wherein the plurality of slaves replying to one ranging request are arranged to insert a predetermined or algorithmically derivable delay before the ranging reply.

6. The wireless network of claim 1, wherein the mobile node is arranged for determining the times of arrival of said ranging requests and ranging replies, and for transmitting said times of arrival, or differences between said times of arrival, to a network infrastructure for localization.

7. The wireless network of claim 6, wherein the mobile node (E) is arranged to transmit received signal strength indicator values to the network infrastructure.

8. The wireless network of claim 1, wherein the broadcasting of ranging requests is planned such that the ranging requests are not broadcast at the same time by nodes that so close as to be simultaneously receivable by a mobile node.

9. The wireless network of claim 1, wherein the broadcast of ranging requests is planned such that the master and slave nodes in a pair are along a plurality of baselines, differently oriented at a right angle.

* * * * *